US012649585B1

(12) United States Patent
Philiben et al.

(10) Patent No.: US 12,649,585 B1
(45) Date of Patent: Jun. 9, 2026

(54) AIRCRAFT STABILITY DETECTION USING FLUID MOTION FOR FLIGHT-CONTROL FEEDBACK

(71) Applicant: CiES, INC., Bend, OR (US)

(72) Inventors: Scott T. Philiben, Bend, OR (US);
Charles R. Urban, Bend, OR (US);
Ryley G. Croghan, Redmond, OR (US)

(73) Assignee: CiES, INC., Bend, OR (US)

( * ) Notice: Subject to any disclaimer, the term of this patent is extended or adjusted under 35 U.S.C. 154(b) by 0 days.

(21) Appl. No.: 19/249,693

(22) Filed: Jun. 25, 2025

Related U.S. Application Data

(60) Provisional application No. 63/663,900, filed on Jun. 25, 2024.

(51) Int. Cl.
B64D 43/00 (2006.01)
B64D 45/00 (2006.01)

(52) U.S. Cl.
CPC ...... B64D 43/00 (2013.01); B64D 2045/0085 (2013.01)

(58) Field of Classification Search
CPC ........................ B64D 43/00; B64D 2045/0085
USPC ............................................................ 701/6
See application file for complete search history.

(56) References Cited

U.S. PATENT DOCUMENTS

| | | | |
|---|---|---|---|
| 6,508,119 | B2 | 1/2003 | Beck, II |
| 6,581,459 | B1 * | 6/2003 | Lichtenfels, II ...... G01F 23/296 |
| | | | 73/290 V |
| 8,209,069 | B1 | 6/2012 | Mcloughlin et al. |

| | | | |
|---|---|---|---|
| 9,637,243 | B2 | 5/2017 | Tiseo et al. |
| 10,697,817 | B2 | 6/2020 | Philiben |
| 11,299,289 | B1 * | 4/2022 | Derstein ................ B64D 43/02 |
| 11,862,029 | B2 | 1/2024 | Haskins et al. |
| 2012/0132751 | A1 * | 5/2012 | Groves ...................... B64C 3/22 |
| | | | 29/428 |
| 2015/0367956 | A1 * | 12/2015 | Loussides .............. B64D 45/04 |
| | | | 701/18 |
| 2016/0246304 | A1 * | 8/2016 | Canoy .................. G05D 1/0011 |
| 2017/0138776 | A1 * | 5/2017 | Philiben .................. G01F 23/80 |
| 2018/0188098 | A1 * | 7/2018 | Souques ................ B64D 37/04 |

(Continued)

FOREIGN PATENT DOCUMENTS

JP        H064439   B2 *   1/1994

OTHER PUBLICATIONS

Scott T. Philiben, STCSA02511SE Installation Manual & Instructions for Continued Airworthiness—CC Series Fuel Level Sender, dated Jun. 16, 2024, 38 pages.

*Primary Examiner* — Hunter B Lonsberry
*Assistant Examiner* — Helen Li
(74) *Attorney, Agent, or Firm* — Foster Garvey PC

(57)        ABSTRACT

Disclosed is a stability-detecting angle of attack (AoA) system for aircraft, enhancing flight safety by monitoring and managing stability. The system includes an AoA sensor for measuring angle of attack, multiple liquid-level senders with sensors for local fluid levels and kinematics, and processors for compensating fluid motion and temperature. An avionics controller receives data from the senders and AoA sensor, calculating combined tank levels and aircraft stability. It generates flight-control information for feedback mechanisms, including cockpit warnings (audible, haptic, visual) and auto flight process changes. The system aims to prevent loss of control at low speeds by alerting pilots to performance issues and structural risks.

30 Claims, 17 Drawing Sheets

(56) References Cited

U.S. PATENT DOCUMENTS

| | | | |
|---|---|---|---|
| 2018/0354610 A1* | 12/2018 | Kneuper | B64C 17/10 |
| 2021/0292009 A1* | 9/2021 | Mangat | G01F 23/804 |
| 2023/0077740 A1* | 3/2023 | Booth | B64C 1/00 |
| | | | 244/13 |
| 2023/0092281 A1* | 3/2023 | Rawdon | B64C 39/10 |
| | | | 244/135 C |
| 2023/0286665 A1* | 9/2023 | Moy | B64F 5/60 |

* cited by examiner

126

MOUNTING
PLATE

LIFT TRANSDUCER
VANE  502

204

Dual Angular Sensor and Processor

VANE BASE

606

612

Airflow Direction
610

604

602

Angular   608
Measurement of the
Aircraft with respect
to the local airflow
vector direction

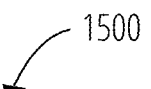

RECEIVE LOCAL TANK LEVELS AND LOCAL KINEMATICS MEASUREMENTS FROM A PLURALITY OF LIQUID-LEVEL SENDERS, WHEREIN EACH LIQUID-LEVEL SENDER INCLUDES A LIQUID-LEVEL SENSOR CONFIGURED TO MEASURE LOCAL FLUID LEVELS WITHIN A WING-MOUNTED LIQUID SYSTEM AND AN ONBOARD ACCELEROMETER CONFIGURED TO MEASURE LOCAL KINEMATICS 1502

RECEIVE AOA INFORMATION FROM AN AOA SENSOR CONFIGURED TO MEASURE THE ANGLE OF ATTACK 1504

PERFORM AN AIRCRAFT STABILITY CALCULATION BASED ON THE LOCAL KINEMATICS MEASUREMENTS AND THE AOA INFORMATION TO DETERMINE THE STABILITY OF THE AIRCRAFT 1506

GENERATE FLIGHT-CONTROL INFORMATION BASED ON THE AIRCRAFT STABILITY CALCULATION 1508

TRIGGER FLIGHT-CONTROL FEEDBACK USING A FLIGHT-CONTROL FEEDBACK SYSTEM BASED ON THE FLIGHT-CONTROL INFORMATION 1510

FIG. 15

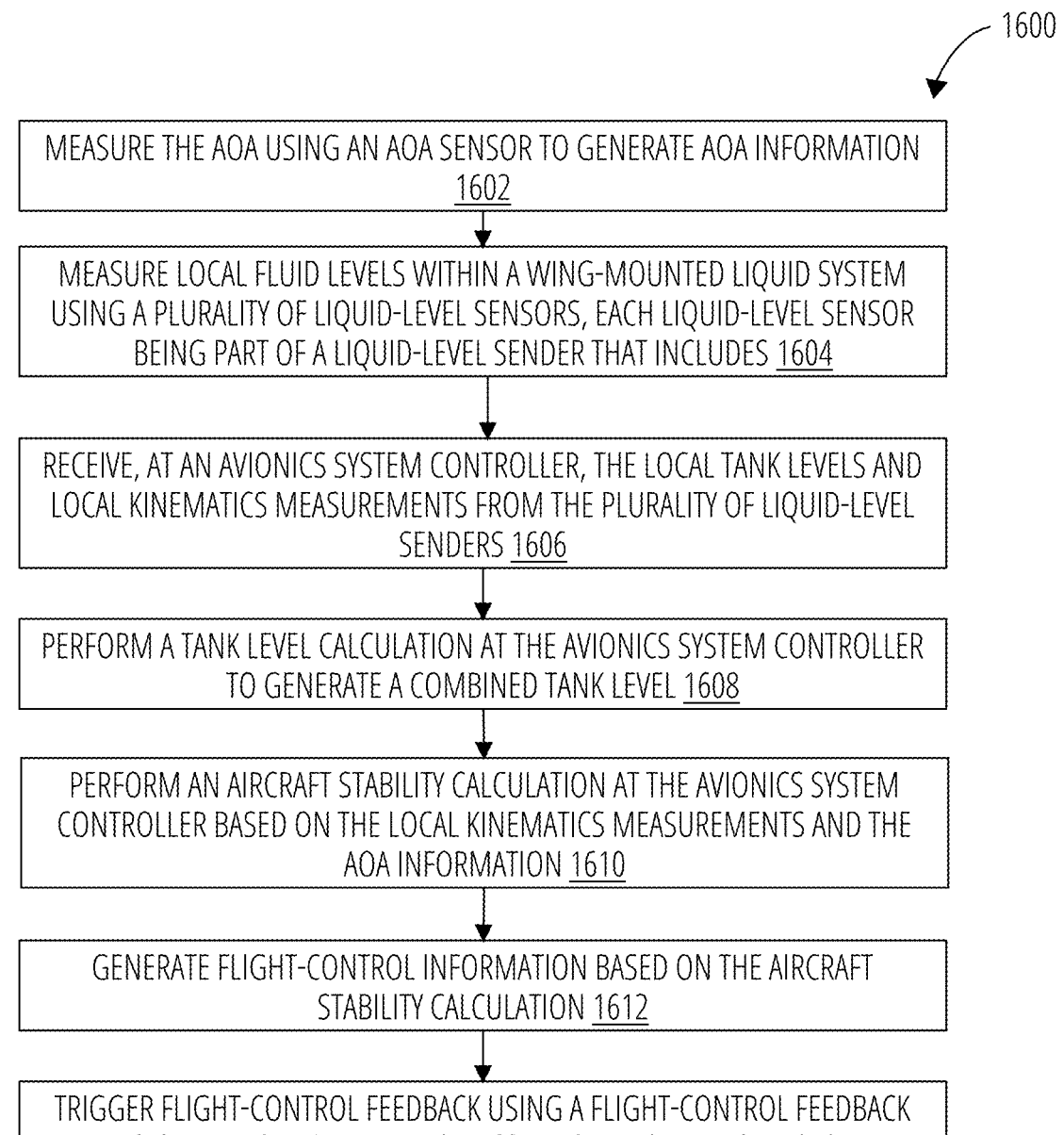

1600

MEASURE THE AOA USING AN AOA SENSOR TO GENERATE AOA INFORMATION 1602

MEASURE LOCAL FLUID LEVELS WITHIN A WING-MOUNTED LIQUID SYSTEM USING A PLURALITY OF LIQUID-LEVEL SENSORS, EACH LIQUID-LEVEL SENSOR BEING PART OF A LIQUID-LEVEL SENDER THAT INCLUDES 1604

RECEIVE, AT AN AVIONICS SYSTEM CONTROLLER, THE LOCAL TANK LEVELS AND LOCAL KINEMATICS MEASUREMENTS FROM THE PLURALITY OF LIQUID-LEVEL SENDERS 1606

PERFORM A TANK LEVEL CALCULATION AT THE AVIONICS SYSTEM CONTROLLER TO GENERATE A COMBINED TANK LEVEL 1608

PERFORM AN AIRCRAFT STABILITY CALCULATION AT THE AVIONICS SYSTEM CONTROLLER BASED ON THE LOCAL KINEMATICS MEASUREMENTS AND THE AOA INFORMATION 1610

GENERATE FLIGHT-CONTROL INFORMATION BASED ON THE AIRCRAFT STABILITY CALCULATION 1612

TRIGGER FLIGHT-CONTROL FEEDBACK USING A FLIGHT-CONTROL FEEDBACK SYSTEM BASED ON THE FLIGHT-CONTROL INFORMATION 1614

FIG. 16

AIRCRAFT STABILITY DETECTION USING FLUID MOTION FOR FLIGHT-CONTROL FEEDBACK

RELATED APPLICATION

The present application claims priority benefit of U.S. Provisional Patent Application No. 63/663,900 filed Jun. 25, 2024, which is hereby incorporated by reference in its entirety.

TECHNICAL FIELD

The present disclosure relates to aircraft flight systems, and more specifically, to systems and methods for detecting and managing the stability and angle of attack (AoA) in aircraft by integration of liquid-level sensors, accelerometers, AoA sensors and avionics system controllers to provide real-time feedback and flight-control information to enhance flight safety and performance.

BACKGROUND INFORMATION

U.S. Pat. No. 6,508,119 of Beck, II, which is assigned to CiES Inc. of Bend, Oregon, describes anisotropic magnetoresistance (AMR) devices used for non-electrically invasive measurements of liquid level, AoA, and control surface deflection. For example, in an aircraft, a fuel transducer utilizes AMR technology to measure liquid levels.

U.S. Pat. No. 10,697,817 of Scott Philiben, which is also assigned to CiES Inc., discusses the integration of aircraft acceleration data (or other flight dynamic outputs) with a fuel transducer to enhance the accuracy of fuel level measurements. This patent describes how an accelerometer can adjust fuel level readings during gusts and turbulence and compensate for changes in the aircraft's pitch or roll angle, providing a more precise reflection of the actual fuel level in the fuel system.

SUMMARY OF THE DISCLOSURE

The present disclosure relates to a stability assessment system designed for aircraft. In some embodiments, the stability assessment system includes one or more liquid-level senders, accelerometers, and an avionics controller configured to compute a stability score. In some embodiments, the term liquid-level sender refers to a device that includes a fluid-level sensor, and optionally, an associated accelerometer and processor. It may also be referred to as a fuel sender or fluid sensor in certain contexts.

In one aspect, the system includes an AoA sensor configured to measure the angle of attack and generate corresponding AoA information. The system further has a plurality of liquid-level senders, each equipped with a liquid-level sensor to measure local fluid levels within a wing-mounted liquid system, an onboard accelerometer to measure local kinematics, and a processor to process these measurements and generate local tank levels by compensating for fluid motion and temperature variations.

An avionics system controller is communicatively linked to the plurality of liquid-level senders and the AoA sensor. This controller receives local tank levels and kinematics measurements, performs calculations to determine combined tank levels and aircraft stability based on these measurements, and generates flight-control information. A flight-control feedback system then utilizes this information to trigger appropriate pilot- or flight-control feedback mechanisms.

The stability assessment system can incorporate various types of liquid-level senders, including float-based fuel senders. The flight-control feedback mechanisms may include cockpit warnings such as audible alarms, haptic feedback in the seat or flight control stick, or visual indicators on cockpit instrumentation. Additionally, the AoA sensor can be a leading-edge lift transducer or a fuselage-mounted airflow sensor.

Further embodiments relate to wing-mounted sensor systems that operate independently to detect instability conditions. In one aspect, a stability sensor system includes a liquid-level sensor positioned within a wing-mounted fuel or fluid tank, an onboard accelerometer co-located with the sensor, and a processor configured to analyze the combined sensor data. Fluid data may include time-series signals, including discrete level measurements, generated by the liquid-level senders, such as slosh displacement, amplitude, damping rate, or other characteristics indicative of fuel motion. The processor determines fluid motion based on changes in liquid level and evaluates local acceleration to derive a stability indicator. This indicator may reflect symmetrical or asymmetrical movement across the wings, pitch instability, or other aerodynamic disturbances.

In some implementations, the stability indicator is based on the detection of exponentially decaying oscillatory motion or on differential acceleration and velocity across wings. The processor may generate a binary or analog signal indicating stall conditions, spin onset, or loss of coordinated flight. These locally derived signals may be transmitted to other onboard systems or used to drive flight-control feedback mechanisms directly, such as pilot alerts, stick shakers, or display indicators.

The sensor system may be configured to recognize stall by identifying a combination of angle-of-attack oscillations, abrupt vertical acceleration, and elevated fuel slosh. Similarly, spin conditions may be identified through detection of diverging wing velocities calculated from integrated accelerometer readings. In some embodiments, thresholds used for detection are tunable based on flight phase or aircraft configuration.

The methods disclosed include measuring local fluid displacement and acceleration, computing derived motion profiles, and triggering feedback when instability exceeds predefined thresholds. These techniques may be implemented at the sensor level, in the absence of a centralized avionics controller, enabling distributed and redundant stability detection. The resulting systems and methods enhance flight safety by providing early warning of aerodynamic instability and by supporting responsive intervention based on real-time sensor data.

The disclosed embodiments aim to enhance aircraft safety by interceding or warning the pilot about poor aircraft/pilot performance, thus assisting in preventing loss of control (e.g., avoiding stalls leading to spins). Some embodiments combine gust reaction data with G loads and AoA measurements to warn of and prevent structural failures or damage.

In certain embodiments, angle of attack information is excluded, and stability is inferred using only local acceleration and fluid displacement data. The disclosed systems and methods cover both integrated avionics configurations and edge-based sensor systems capable of local stability detection. In the latter case, a wing-mounted sensor equipped with a liquid-level transducer, accelerometer, and onboard processor may independently compute a stability metric and initiate a feedback signal. Such systems may operate autonomously or in conjunction with aircraft-wide avionics infrastructure.

Further aspects and advantages of the stability assessment system will be apparent from the detailed description of embodiments provided in conjunction with the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 15 is a flow chart of a process for detecting stability in an aircraft in accordance with one embodiment.

FIG. 16 is a flow chart of a process for detecting stability in an aircraft in accordance with one embodiment.

DETAILED DESCRIPTION OF EMBODIMENTS

Figure 1:
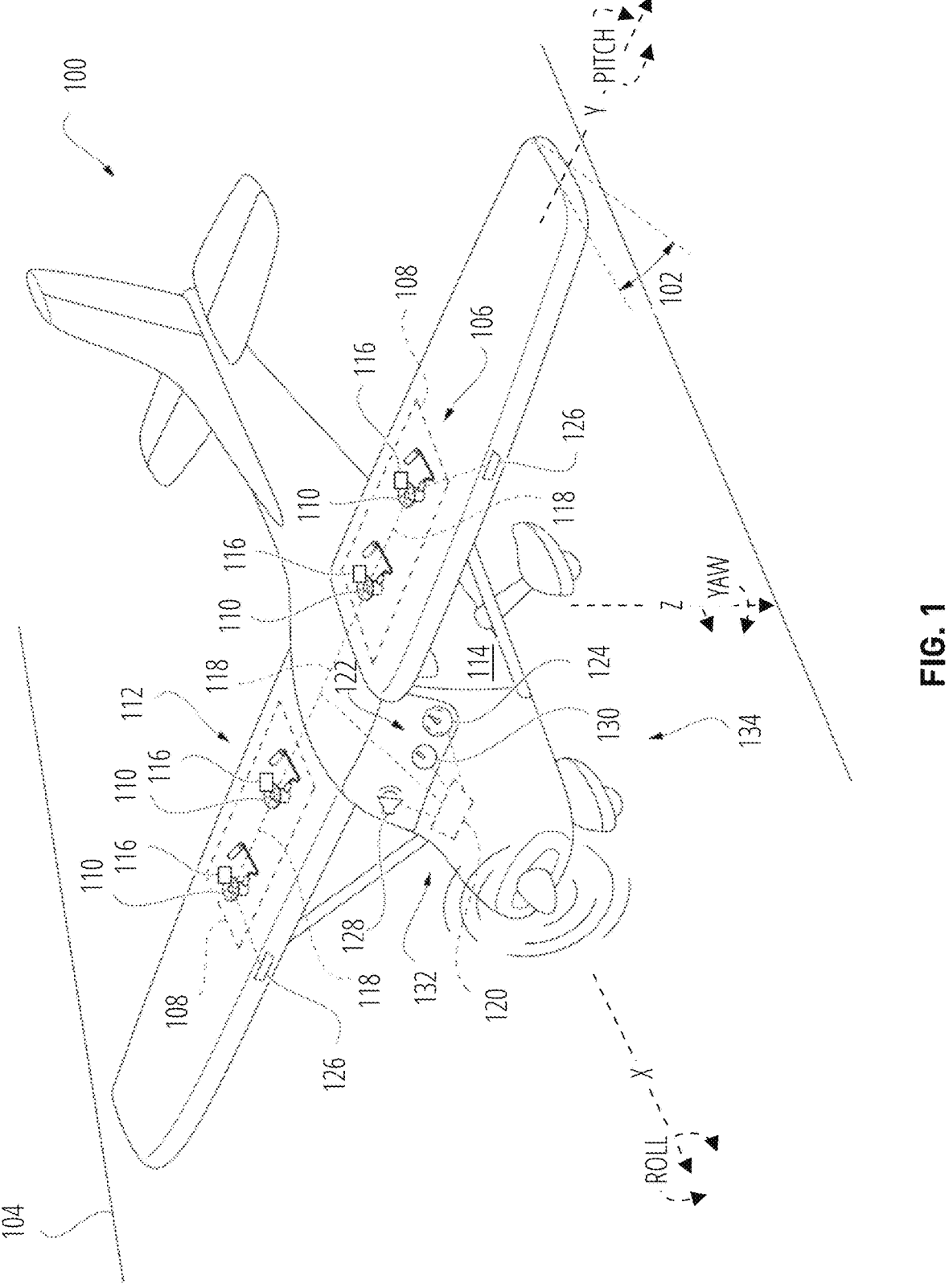
FIG. 1 is a perspective view of an aircraft descending during landing on a runway in accordance with one embodiment.

FIG. 1 shows an aircraft 100 as it descends at an AoA 102 to make a landing on runway 104. In this example, aircraft 100 is a light general aviation airplane with a propeller, similar to a Cessna 172 Skyhawk. Skilled persons will appreciate that other examples, such as those shown in FIG. 2 (described below) include medium aircraft applications such as a Cirrus jet, Cessna Caravan, or other jet- or fan-based powerplants are employed.

Through development of sensors for a wing-mounted liquid system 106 (e.g., wing tanks 108), the present inventors have observed that fluid motion (e.g., fuel or other liquid) indicates issues with pilot performance, localized gusts, and aircraft reactions. Movement and motion of liquid in wing tanks 108 offer highly sensitive insights into flight behavior that departs from coordinated or smooth flight during descent to landing or other critical flight regime. For instance, this motion may be used to evaluate pilot performance in the landing phase because it reveals pitch oscillations and deviations from an optimal landing pattern profile.

An aircraft liquid sending unit 110 (also referred to as a fuel or liquid sensor, sender, probe, or transducer) is a component for measuring liquid quantity and is typically mounted within fuel tanks or reservoirs. They employ a variety of measurement techniques to accurately determine the liquid level. These techniques include float-based systems or techniques such as probe, remote (e.g., ultrasonic), and reed switch. Regardless of the specific technology used, a core principle involves translating the position of a tank's liquid level into a signal that can be interpreted by the aircraft's avionics.

In the embodiment of FIG. 1, a plurality of float-based fuel senders 112 (see, e.g., FIG. 4) in the wings of aircraft 100. Due to dihedral (wings angled up from a fuselage 114 to promote stability), more than one sender per wing is used to measure fuel, and each one employs an onboard accelerometer 116. Each onboard accelerometer 116 is configured to track movement of wing-mounted liquid system 106. Because each onboard accelerometer 116 is subject to local movement conditions, it compensates for fluid motion resulting from those conditions. Integrated processors (not shown) use this information to derive a local fuel level while eliminating the effects of pitch, yaw, or roll. Float-based fuel senders 112 are interconnected through an independent data communication bus 118 (e.g., TCAN334 for CAN Bus, ISL3178 for RS485, and I2C for some level of internal communication on liquid level senders) so that each local fuel level is provided as an input to an avionics system controller 120 that determines a computed fuel volume onboard aircraft 100, which is transmitted to cockpit instrumentation 122 such as a fuel gauge 124 providing pilots with vital information for flight planning and safety.

An example avionics system controller 120 is a GFC™ 500 digital autopilot for general aviation aircraft, available from Garmin Ltd. The GFC 500 is designed for light piston aircraft and offers advanced features such as Automatic Flight Control System (AFCS) providing precise control and stability for various phases of flight; Electronic Stability and Protection (ESP) helping to prevent inadvertent flight attitudes and speeds; Level Mode returning the aircraft to straight and level flight with a single button press; Vertical Navigation (VNAV) providing altitude preselect and flight director cues; and integration with Garmin G3X Touch allowing seamless integration with Garmin's flight display systems for enhanced situational awareness and control. This system is used in general aviation aircraft due to its reliability, features, and integration capabilities.

As noted above, localized fuel motion also represents the overall stability of the aircraft in flight, as motion of the fuel is a direct reaction to flight conditions or pilot inputs. This stability information is collated with AoA information from an AoA sensor. An example of an AoA sensor specifically a leading-edge lift transducer 126 to measure degree of flow over a wing surface, is described later with reference to FIG. 5.

The stability information combined with the AoA information indicates departures from ideal flight even under difficult conditions. Therefore, it provides additional information to a cockpit warning system 128 (e.g., for stall warnings), gauges (e.g., AoA display 130), or other forms of feedback to enhance warnings in flight. In other words, the larger dataset produces a more effective warning to a pilot or allows protection of the aircraft loss of control or aircraft structural damage through an auto flight system. In this disclosure, audible or visual stall warnings, haptic feedback (e.g., seat or controls shakers), auto flight process for envelope control of aircraft 100, and other forms of corrective measures are generally referred to as flight-control feedback from flight-control feedback systems 132.

As fuel measurement depends on the accurate, reliable measurement of angles of a float on the fuel surface, conventional angle of attack systems can be readily enhanced by float-based fuel senders 112. The combination of onboard accelerometers 116 in float-based fuel sender 112, leading-edge lift transducers 126 (or other AoA sensor, see, e.g., FIG. 2), and cockpit warning system 128 is generally referred to as a stability assessment system 134.

As shown in FIG. 1, wing-mounted AoA sensors, such as leading-edge lift transducer 126, are used on propeller-based aircraft due to propwash effects on fuselage 114. In other embodiments, jet- or fan-based powerplants support a side-mounted AoA probe as there is no influence from propwash.

Figure 2:
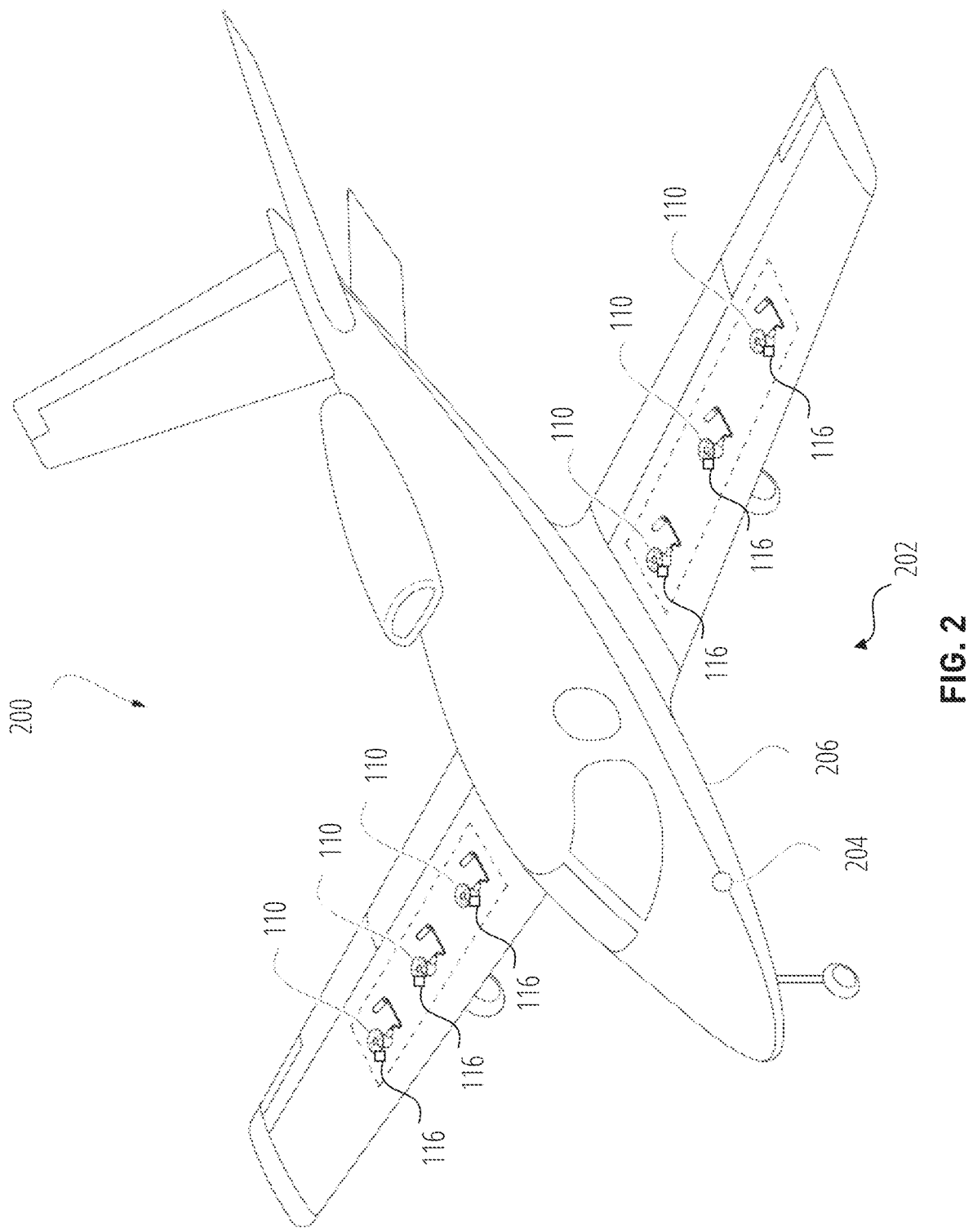
FIG. 2 is a perspective view of an aircraft descending during landing on a runway in accordance with another embodiment.

For instance, FIG. 2 shows a jet-powered aircraft 200, such as a Cirrus Vision SF50, with another example of a stability assessment system 202. In this example, stability assessment system 202 includes a side-mounted AoA sensor 204 on its fuselage 206 to measure airflow relative to aircraft progress. An example of side-mounted AoA sensor 204 is described later with reference to FIG. 6.

FIG. 2 also shows an example of three aircraft liquid sending units 110 per wing. Three or more aircraft liquid sending units 110 provide a distribution of sensors in the wing for improved accuracy. Although not shown, jet-powered aircraft 200 includes similar features as those shown in aircraft 100 (e.g., data communication bus 118) for implementing stability assessment system 134.

Figure 3:
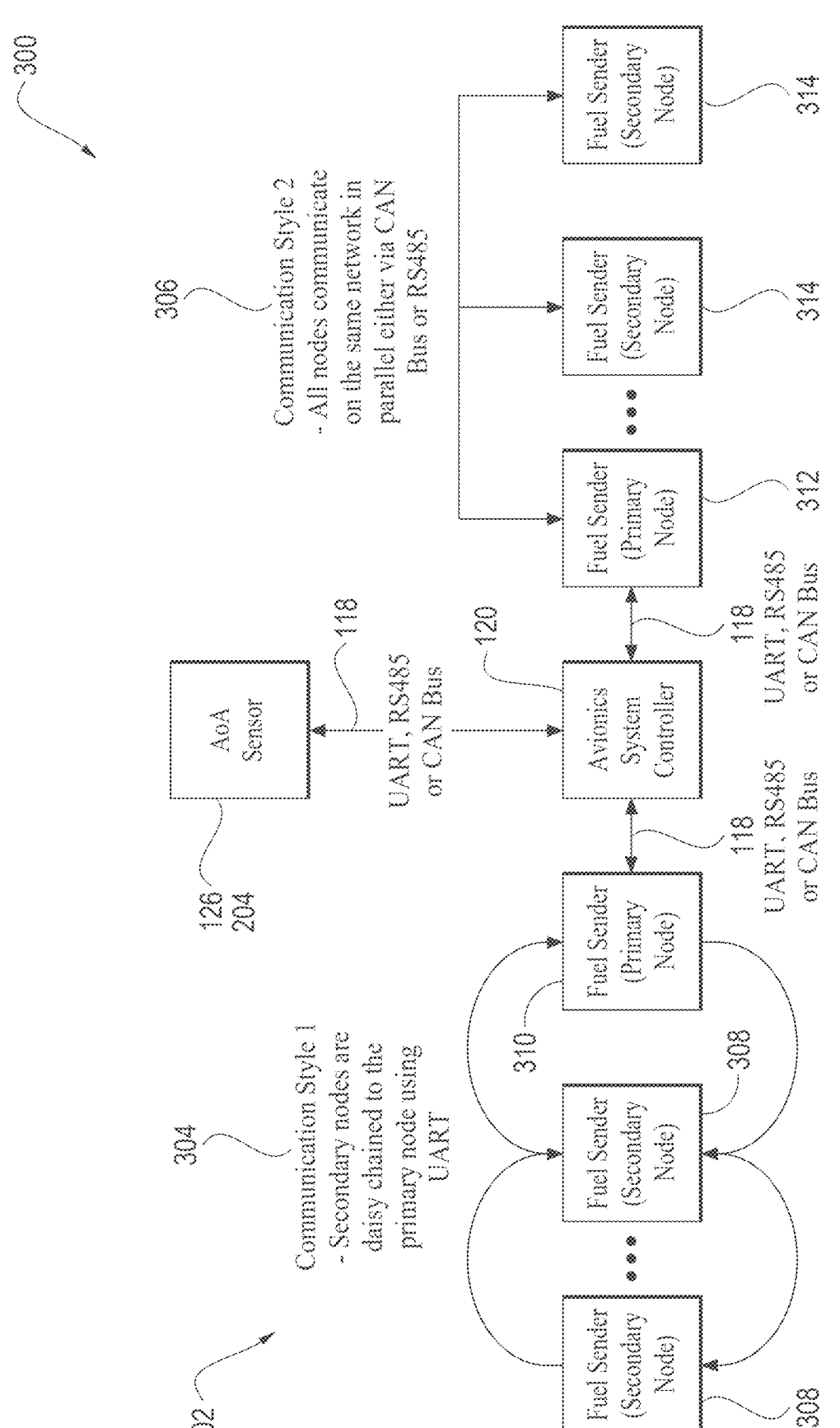
FIG. 3 is a block diagram of a data communication architecture in accordance with one embodiment.

FIG. 3 shows a data communication architecture 300 for a stability assessment system 302 (e.g., stability assessment system 134 or stability assessment system 202). Data communication architecture 300 highlights two communication styles, i.e., first communication configuration 304 and second communication configuration 306, for integrating liquid-level sensors, accelerometers, and avionics system controllers within an aircraft. In practice, an aircraft would have a common commutations bus for all fuel senders, but both options are shown in FIG. 3 for conciseness.

First communication configuration 304 utilizes a daisy-chain configuration where fuel senders 308 act as secondary nodes are connected to a primary node, fuel sender 310 and communicate using Universal Asynchronous Receiver-Transmitter (UART) communication. Primary node 310 collects data from secondary nodes 308 and transmits the aggregated information to avionics system controller 120.

In contrast, second communication configuration 306 employs a parallel communication network where all nodes (both primary node 312 and secondary nodes 314) communicate on the same network using either Controller Area Network (CAN) bus or RS485 protocols. Each fuel sender 310, 314 independently transmits data directly to avionics system controller 120. This method enhances reliability and scalability, as each node operates independently within the network, reducing the risk of single points of failure and allowing for easier expansion of the system.

Data communication bus 118 facilitates the transmission of information between the various components, supporting different communication protocols (UART, RS485, or CAN bus) depending on the chosen communication style. This bus 118 ensures that all relevant data, including local fluid levels, kinematics measurements, and AoA information, is accurately relayed to avionics system controller 120 for processing.

Figure 4:
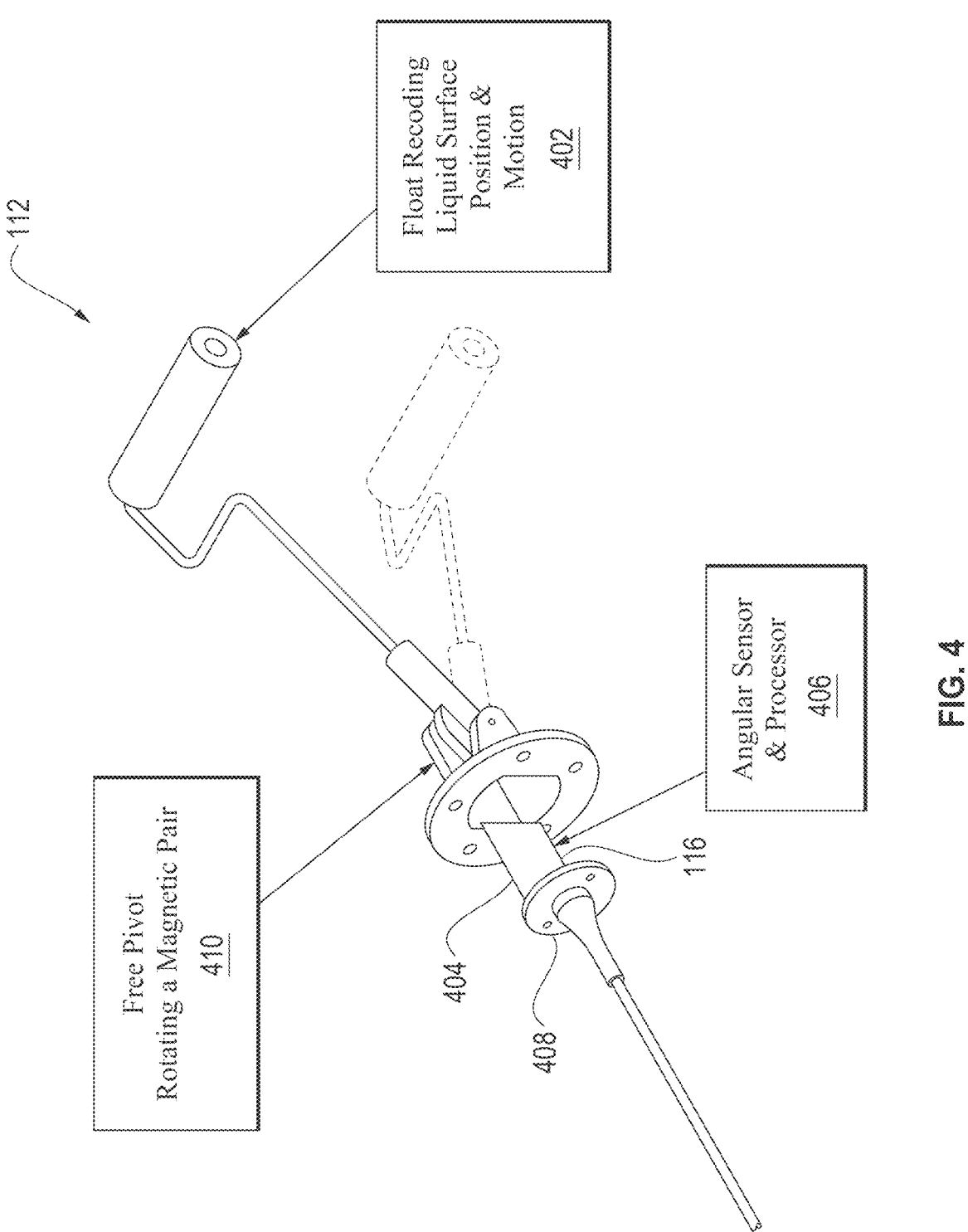
FIG. 4 is a perspective view of a float-based fuel sender in accordance with one embodiment.

FIG. 4 shows in greater detail float-based fuel sender 112 available from CiES Inc. Float-based fuel sender 112 includes a float 402, circuit board 404 with circuitry including a processor 406 and associated electronics such as onboard accelerometer 116 and interface circuitry for communicating aircraft stability information over data communication bus 118, and a wire harness 408.

Float 402 is usually made of a buoyant material like foam or plastic. It is designed to float on the surface of the fuel inside the tank. As the fuel level changes, the float rises and falls accordingly. Float-based fuel sender 112 is typically calibrated to ensure accurate readings. This calibration entails setting the range of values corresponding to various fuel levels. Manufacturers do this to ensure that the fuel gauge accurately displays the actual fuel level in the tank.

Inside the fuel tank, there is a measuring device (e.g., AMR 410) that is connected to float 402. The measurement signal from AMR 410 changes based on the position of float 402 as it moves up and down. AMR 410 is part of an electrical circuit that includes avionics system controller 120 and fuel gauge 124 (FIG. 1) on the dashboard. As the float moves and changes the signal, fuel gauge 124 reflects this change.

Circuit board 404 includes an integrated processor 406 and onboard accelerometer 116. Examples of these components include ST Microelectronics M0 Cortex ARM Processor and MMA8652FCR1 accelerometer.

Figure 5:
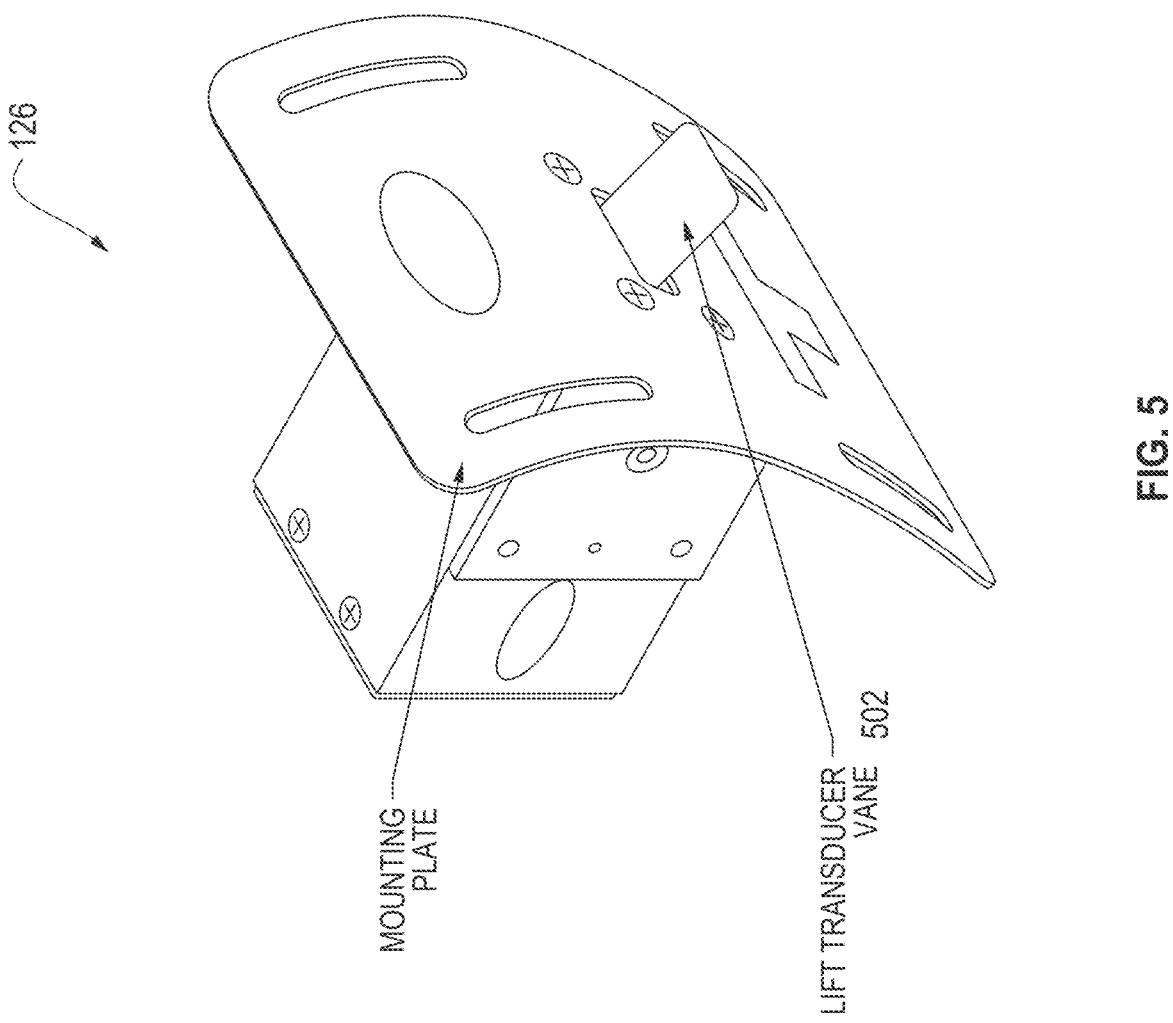
FIG. 5 is a perspective view of a lift transducer in accordance with one embodiment.

FIG. 5 shows in greater detail leading-edge lift transducer 126, which is also available from Safe Flight Instrument, LLC. Leading-edge lift transducer 126 is designed to measure the wing's leading edge stagnation point and airflow. This measurement provides an accurate AoA indication of the margin above stall, irrespective of the aircraft's weight, wing loading, gear configuration, air density, and slip conditions. A touted advantage of using leading-edge lift transducer 126 in lieu of side-mounted AoA sensors is its ability to provide a direct measurement of stall margin, avoiding the need for complicated derived calculations that vary with aircraft weight, load factor, and center of gravity.

As described in U.S. Pat. No. 9,637,243 of Tiseo et al., leading-edge lift transducer 126 employs a magnetic sensing circuit that generates an electrical output proportional to the deflection of a small tab or vane 502. Vane 502 protrudes into the airflow on the wing's undersurface. Airflow from the stagnation point deflects the vane, which moves relative to the stagnation point position. The stagnation point's position on the wing correlates with the AoA and shifts aft as the AoA increases, reaching a maximum aft position at stall. Leading-edge lift transducer 126 detects the stagnation point's location and relays this information to the pilot, aiding in stall awareness. This allows the pilot to continuously monitor the vane's position and the stagnation point.

Leading-edge lift transducer 126 can be utilized with various cockpit systems, such as integrating with a glass cockpit for slow-speed awareness and stall warning, driving a fast-slow indicator on a flat-panel display, or displaying the optimum AoA during climb and descent. In other embodiments, leading-edge lift transducer 126 can interface with an independent computer (e.g., avionics system controller 120, FIG. 1) to generate flap-compensated stall warnings or drive flight control and auto-throttle systems.

Figure 6:
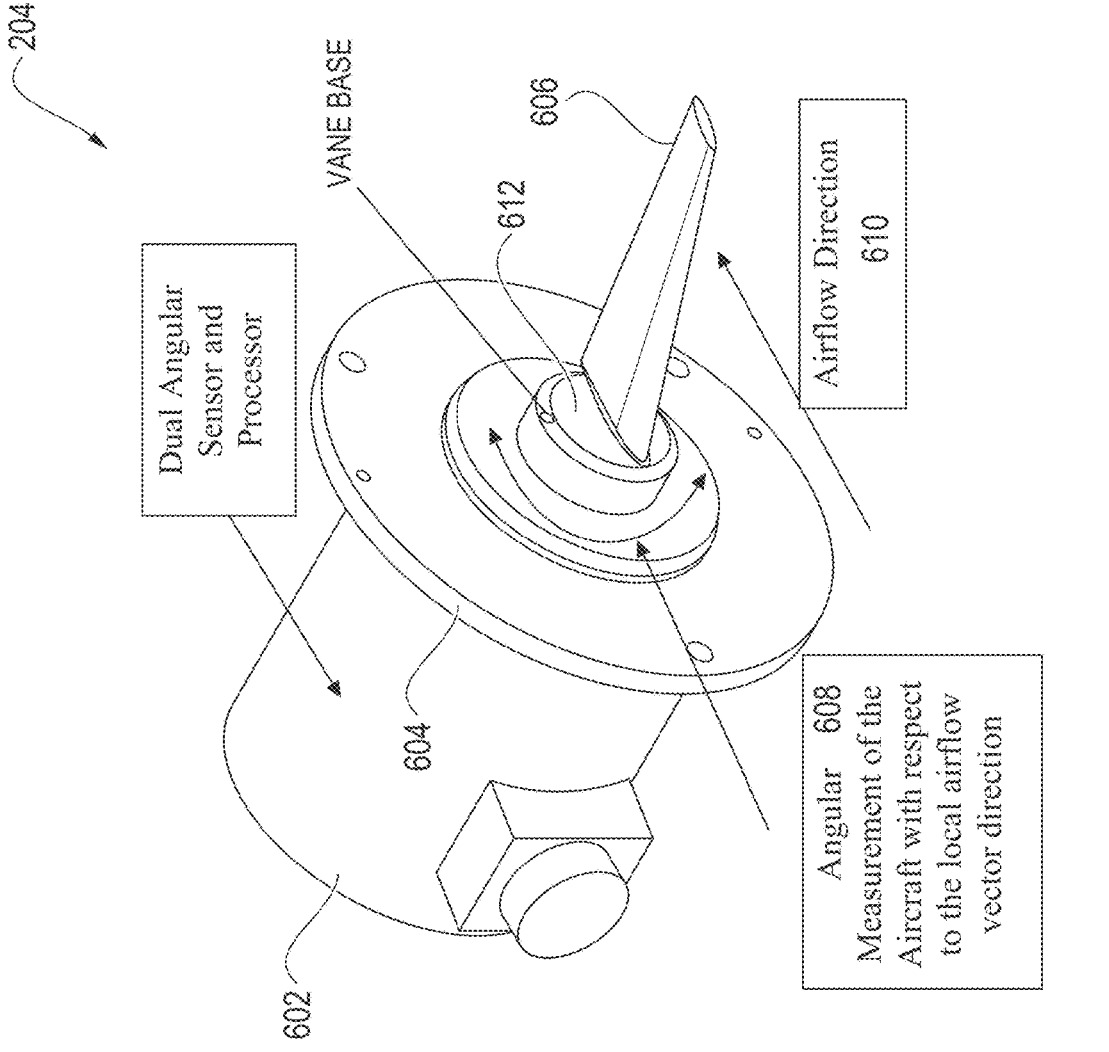
FIG. 6 is a perspective view of an AoA sensor in accordance with one embodiment.

FIG. 6 shows in greater detail side-mounted AoA sensor 204 available from Safe Flight Instrument, LLC of White Plains, New York. A cylindrical sensor body 602 is mounted within fuselage 114 via a mounting plate 604 configured for integration with aircraft 100 (FIG. 1). Side-mounted AoA sensor 204 is designed for installation on the side of fuselage 114 (FIG. 1), where it measures the local airstream angle relative to the fuselage horizontal reference plane. Side-mounted AoA sensor 204 provides accurate measurement for AoA inputs to onboard indicators and computers.

Side-mounted AoA sensor 204 includes an aerodynamically swept vane 606 equipped with integral, long-life ceramic heaters (not shown). Vane 606 is capable of freely rotating through a full 360-degree rotation 608 and is accurately counterbalanced, ensuring that its position is solely determined by the surrounding airstream direction 610. Vane 606 has an aerodynamically efficient swept shape and a hard-plated surface that contribute to a low drag coefficient and wear resistance.

A hinge mechanism 612 secures vane 606 at its base, preventing separation upon impacts such as bird strikes, thereby minimizing potential damage to the aircraft engines. If vane 606 is damaged, it can be replaced externally without the need for realignment or further adjustment.

In other embodiments, a null finding AoA instrument uses a motor to present a heated cone with ports. The motor rotates the cone to get equal pressure on the ports. Other types of AoA sensors are also possible.

Figure 7:
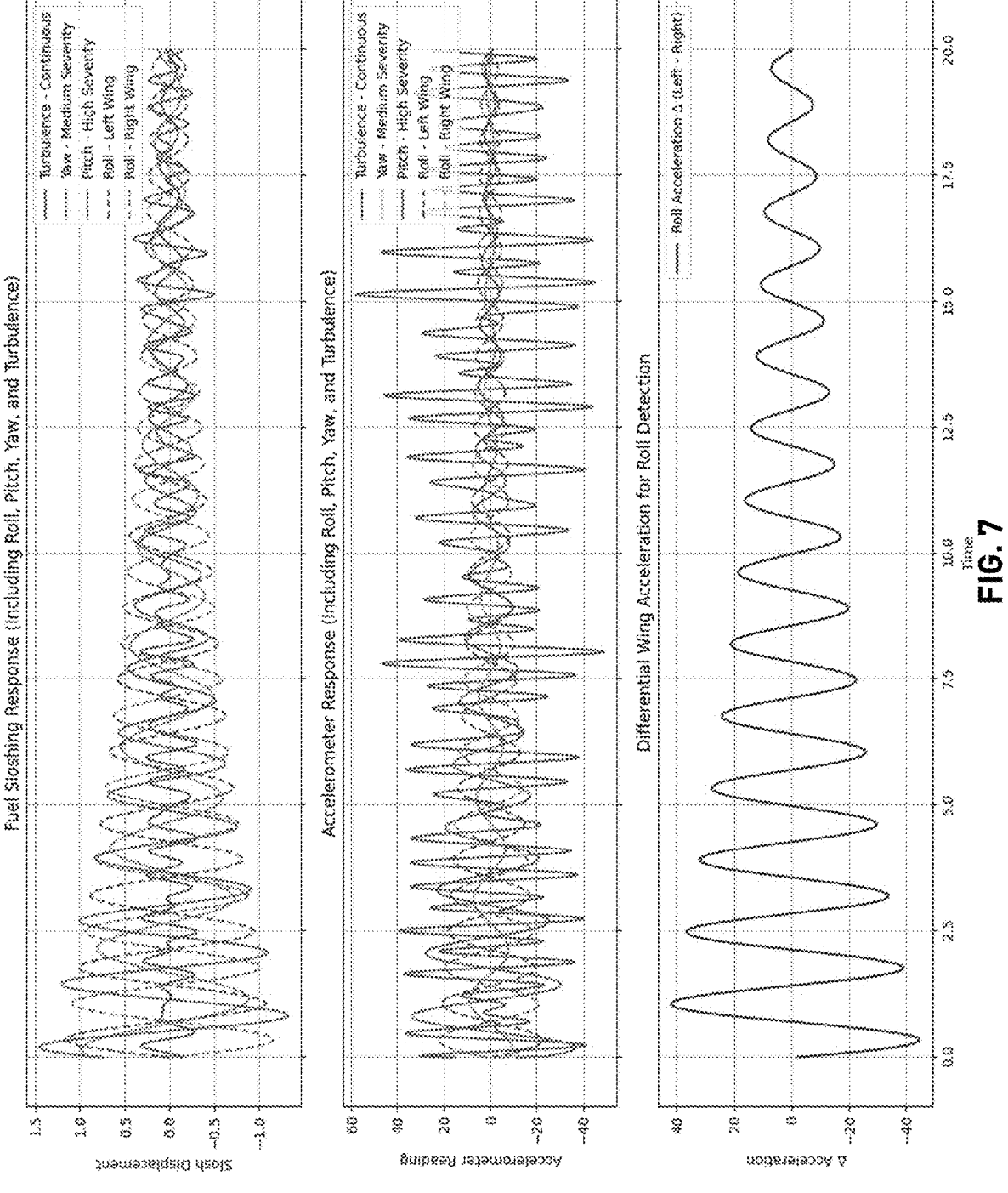
FIG. 7 is a set of plots showing fuel slosh and accelerometer responses during roll, pitch, yaw, and turbulence events, used to detect single event upsets and classify symmetrical versus asymmetrical flight disturbances.
Figure 8:
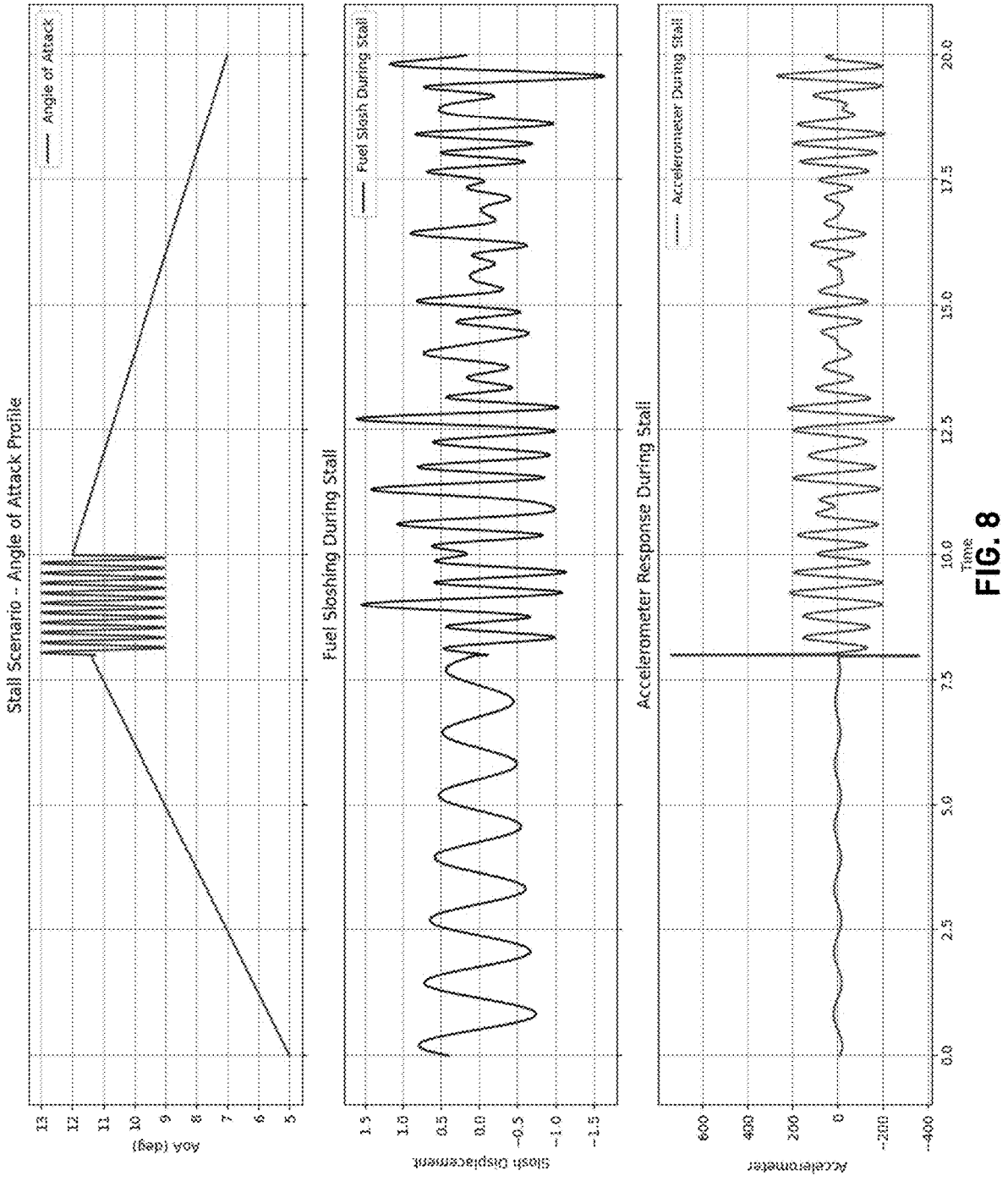
FIG. 8 is a set of plots showing angle of attack oscillation, vertical acceleration, and fuel slosh behavior during stall entry, used to confirm stall conditions based on converging sensor signatures.
Figure 9:
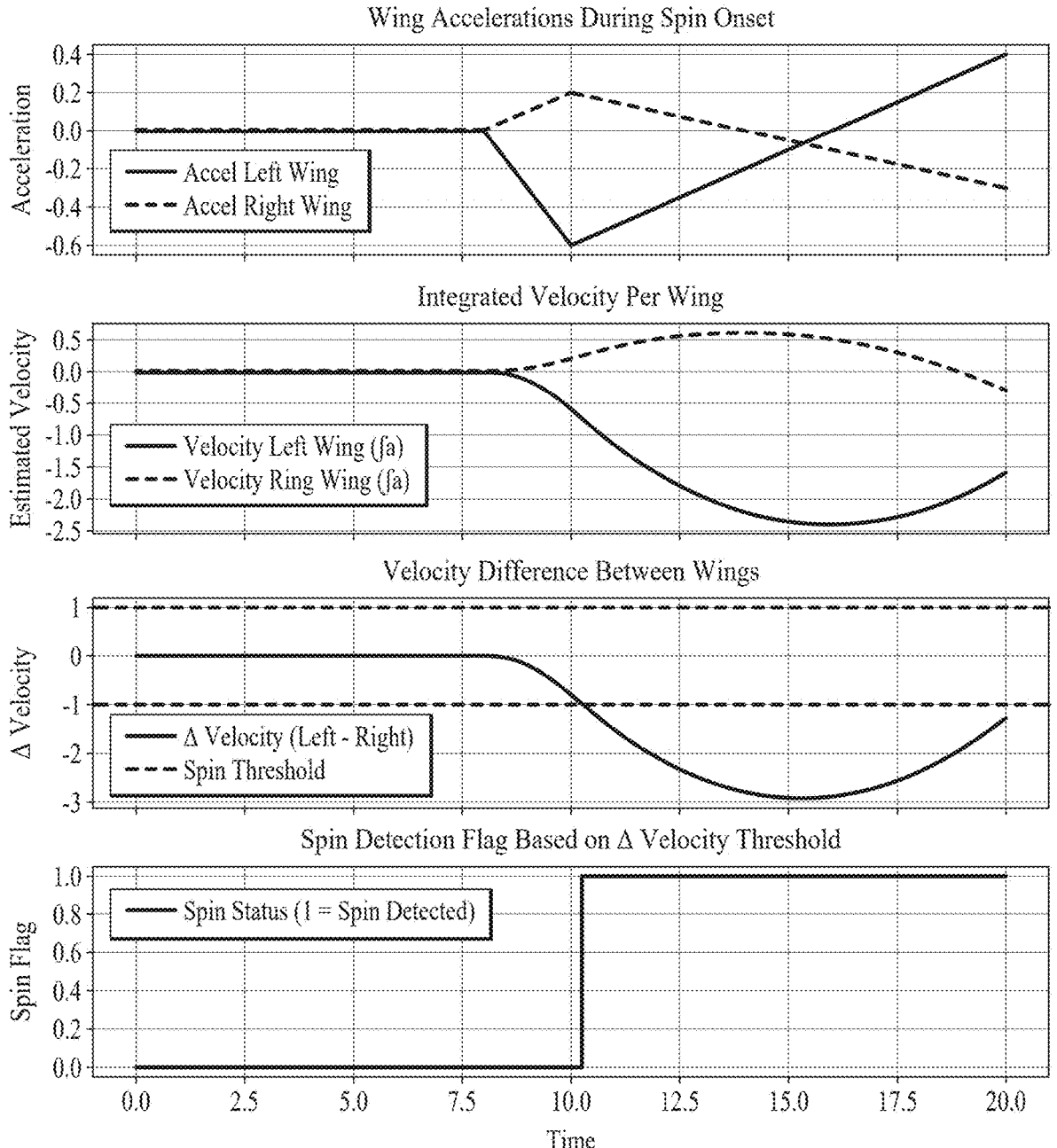
FIG. 9 is a set of plots illustrating the onset of a spin condition based on differential wing acceleration and velocity divergence, including a spin detection threshold and spin flag output.

The following description of FIG. 7-FIG. 9 provides representative sensor outputs and derived behaviors that underpin the stability calculations. These plots illustrate how specific disturbances, such as pilot-induced maneuvers (e.g., pitch, roll, or yaw inputs), aerodynamic effects (e.g., stall or spin onset), or environmental turbulence, are captured at the sensor level through fuel slosh dynamics and differential accelerometer readings. FIG. 7-FIG. 9, therefore, collectively represent detection signatures, or the characteristic sensor responses associated with various types of instability. These detection signatures are generated locally by sensors onboard the aircraft and serve as foundational data inputs for higher-level stability determinations.

FIG. 7, in particular, shows how the system identifies the nature and severity of various single event upsets (SEUs), forming a layer of detection used by the stability-scoring algorithm. Specifically, FIG. 7 presents a set of plots that illustrate system response to various flight disturbances, including roll, pitch, yaw, and turbulence. These are characterized as SEUs and highlight the system's ability to differentiate between symmetrical and asymmetrical motion using fuel slosh data and accelerometer readings. These plots collectively demonstrate how combining fuel slosh behavior and accelerometer asymmetry can help reliably identify the type and severity of SEUs, laying the groundwork for automated flight-control feedback in response to developing instability.

The top plot in FIG. 7 shows modeled fuel sloshing displacement for multiple SEU types. These waveforms follow an exponentially decaying sinusoidal form:

$$\text{Slosh Displacement} = e^{-damping \cdot t} \cdot \sin(2\pi f t + \phi)$$

While this equation is not a perfect match for all sloshing dynamics, it provides an approximation for detecting SEU patterns. An insight from this plot is the decaying amplitude, which helps isolate discrete pilot-induced upsets (such as yaw or pitch) from more stochastic events like turbulence. Notably, only pitch and turbulence may produce nearly symmetrical responses on both left and right wings, but turbulence is inherently more random in nature. This distinction is useful for discriminating controlled pitch movements from unpredictable gusts.

The middle plot in FIG. 7 captures the accelerometer response corresponding to the same conditions. It highlights how turbulence yields high-frequency and variable-amplitude oscillations, while yaw and pitch events tend to exhibit more organized structure. The accelerometer signals also include left- and right-wing comparisons to facilitate roll event detection.

The bottom plot displays differential wing acceleration, i.e., the left-wing accelerometer reading subtracted from the right-wing reading. Sustained divergence between the two is indicative of roll instability and potential spin entry. This differential signal serves as an input to the aircraft stability algorithm, especially in the derivation of Relationship 4 described below, which assesses yaw and roll coupling based on asymmetric wing motion.

FIG. 8 illustrates an expanded sequence of signal processing and detection logic for identifying stall, spin, or control instability using combined data from AoA sensors, accelerometers, and fuel slosh behavior. This plot complements the earlier analysis shown in FIG. 7 by aligning sensor outputs with event-specific detection thresholds and classification boundaries.

The top plot in FIG. 8 displays the angle of attack over time as the aircraft transitions from normal flight into a stall regime. The AoA increases steadily until it exceeds a defined threshold, beyond which the signal begins to oscillate, which is an indicator of airflow separation and loss of lift. This oscillatory behavior is one of the core signatures used to detect stall onset.

The middle plot presents the fuel slosh displacement measured across one or more wing-mounted liquid-level senders. The slosh signal, while subject to damping, also shows increased amplitude and irregularity during the same window in which AoA and acceleration data indicate instability.

The bottom plot shows corresponding acceleration data along the vertical axis. During stable flight, acceleration remains within a predictable band; however, as the aircraft approaches stall, a sudden spike in vertical acceleration is observed, reflecting abrupt control surface reactions or aerodynamic buffeting. The temporal alignment of the AoA oscillation and acceleration spike reinforces the stall condition and reduces false positives from turbulence alone.

The convergence of these three indicators in FIG. 8 (unsteady AoA, spiking vertical acceleration, and elevated slosh activity) allows avionics system controller 120 to classify the event as a stall with high confidence. In some embodiments, thresholds for each signal type are stored in memory and dynamically adjusted based on flight phase or aircraft configuration (e.g., gear down, flap settings). When all three signals cross their respective thresholds in alignment, a multi-factor confirmation triggers cockpit warnings and optional flight-control responses as described later. FIG. 8 therefore illustrates the practical fusion of aerodynamic, kinematic, and inertial signals to robustly detect stall conditions in real time.

FIG. 9 illustrates a multi-stage sensor and logic sequence used to detect a developing spin condition through analysis of wing accelerations, velocity divergence, and threshold-based decision logic. This figure builds on the system's ability to differentiate between symmetric and asymmetric wing behavior using local accelerometer data from each wing-mounted sensor.

The top plot shows the local acceleration detected in the left and right wings during the early stages of a spin onset. The left wing begins to decelerate while the right wing experiences a slight increase in acceleration. This asymmetry is subtle at first but becomes more pronounced over time, indicating differential aerodynamic loading or control surface deflection.

In the second plot, these local accelerations are numerically integrated to yield estimated wing velocities. The resulting curves show diverging velocity profiles: the right wing maintains or slightly gains velocity, while the left wing loses velocity over the same interval. This velocity divergence is a key indicator of spin entry, as one wing effectively "drops" while the other maintains lift and forward momentum.

The third plot explicitly quantifies this divergence by plotting the differential velocity between the wings (left minus right). As the spin develops, the Δ-velocity moves past a predetermined threshold range, shown as red dashed lines. Exceeding this threshold implies a critical loss of coordinated flight, consistent with a developing spin condition.

The bottom plot displays the output of a spin detection flag. When the A-velocity surpasses the set threshold, the system triggers the spin status flag—shown here transitioning from 0 to 1. This binary output is used by avionics system controller 120 to initiate flight-control feedback, such as autopilot disengagement, haptic alerts, or envelope protection. The use of wing-specific accelerometer integration allows for early spin detection based solely on inertial and velocity-derived data, without requiring full-state aircraft modeling.

In some embodiments, the output may be a digital status flag, a bitmask, or a numerical variable broadcast over a Controller Area Network (CAN) bus. In other embodiments, the output may take the form of an analog voltage threshold, a pulse-width modulated signal, or a coded message transmitted over a serial protocol such as RS-485. These outputs allow the system to interface with a wide range of avionics systems, whether through direct electrical signaling or via digital communication protocols.

Figure 10:
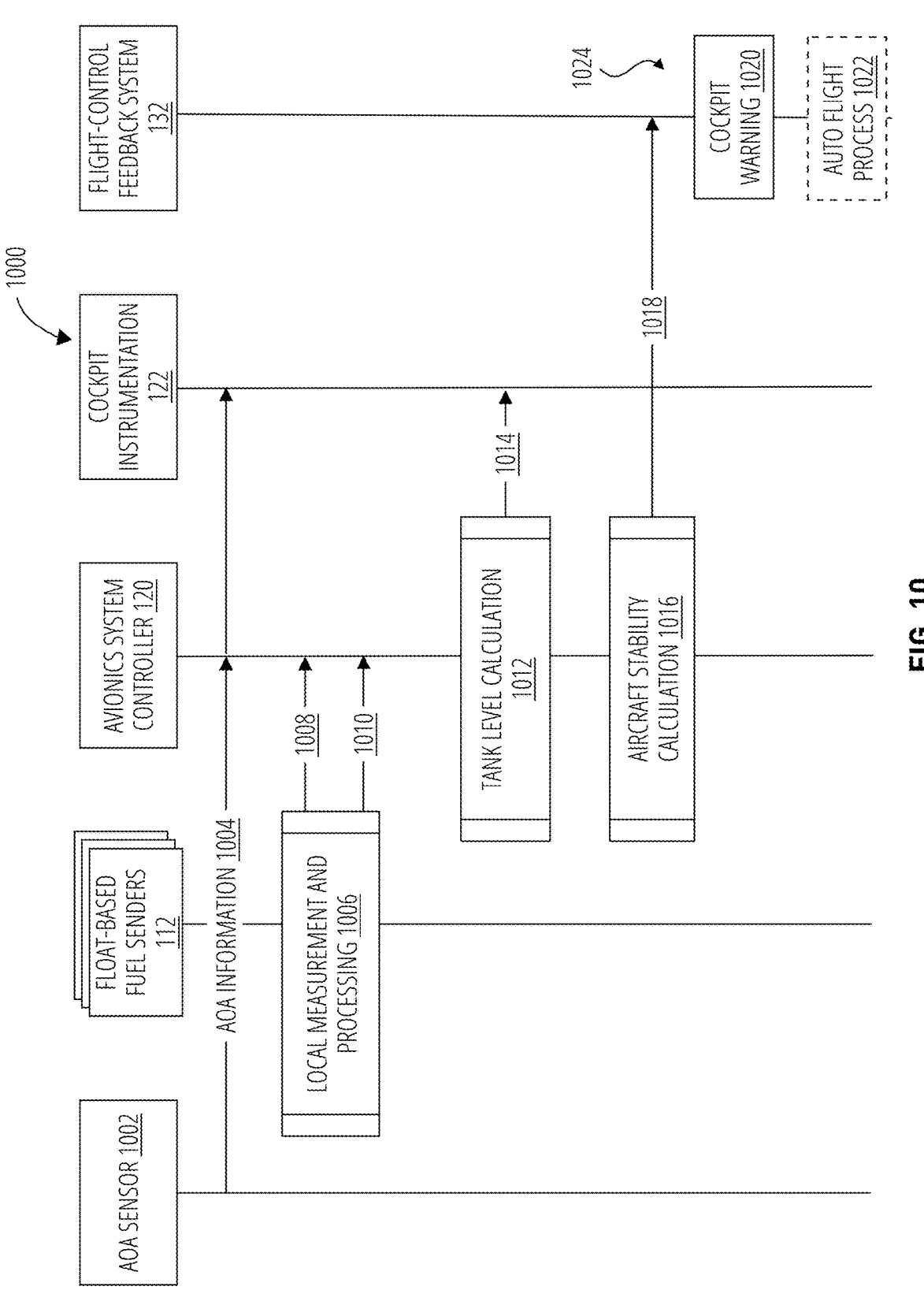
FIG. 10 is a sequence diagram showing communications and processing steps in a stability assessment system, including collection of AoA and fuel sender data, local measurement and processing, stability calculation, and triggering of flight-control feedback or pilot alerts.

FIG. 10 shows an example of communications 1000 for stability assessment system 134 (FIG. 1). Initially, AOA information 1004 is provided over data communication bus 118 (FIG. 1) from an AOA sensor 1002 (e.g., one or both of side-mounted AOA sensor 204 or leading-edge lift transducer 126) to avionics system controller 120. Avionics system controller 120 uses AOA information 1004 to update cockpit instrumentation 122.

Next, during local measurement and processing 1006, each float-based fuel sender 112 samples its local fluid level, fluid motion (detected by, e.g., the float arm moving and being processed as an angle that is changing), and temperature measurements. Each float-based fuel sender 112 also reads its onboard accelerometer 116. These measurements are then processed locally at each processor 406 to generate local tank levels 1008. Local tank levels 1008 may be in terms of volume units, percentage, or any other similar type of local tank measurements that have been compensated for the temperature and motion using low-pass filtering or smoothing techniques. Additional data associated with local tank levels 1008 (e.g., fuel sloshing) may also be determined, as noted below.

Furthermore, each float-based fuel sender 112 generates local kinematics measurements 1010, which in some embodiments include any of raw multi-axis accelerometer readings, derived velocity measurements, or positional information. In other embodiments, local kinematics measurements 1010 are based on various other kinematic sensors (e.g., gyroscopic, velocity, or other types of sensors). Kinematics data includes multi-axis acceleration, velocity, and optionally derived movement vectors.

Local tank levels 1008 and local kinematics measurements 1010 are also signaled to avionics system controller 120 over data communication bus 118. In some embodiments, the additional data, such as fluid motion, is provided to avionics system controller 120. In other embodiments, avionics system controller 120 is configured to derive fluid motion based on changes in local tank levels 1008 and associated data from float-based fuel sender 112. For instance, the following formulas show example relationships for fuel sloshing and gust factor that are made available to, or calculated by, avionics system controller 120.

$$\text{Fuel Sloshing Coefficient}(C_{Fuel\text{-}sloshing}) \sim \qquad \text{Relationship 1}$$
$$\frac{dfuel}{dtime} \approx \frac{\Delta\text{Fuel Measurment}}{\Delta\text{time}}$$

$$\text{Gust Factor} \sim k * \|C_{Fuel\text{-}sloshing:LW} - C_{Fuel\text{-}sloshing:RW}\| \qquad \text{Relationship 2}$$

In Relationship 2, LW stands for the left wing, RW stands for the right wing, and k is a correction factor. Gust factor is a magnitude of the change in fuel sloshing in the left wing compared to the right wing multiplied by a correction factor. As explained in greater detail later, gust factor has a relationship to stability and whether an aircraft attitude was due to turbulence/external factors or aircraft control.

With AOA information 1004, local tank levels 1008, and local kinematics measurements 1010, next avionics system controller 120 performs a tank level calculation 1012 to generate combined tank level 1014 (e.g., volume units, percentage, or other combined value). Combined tank level 1014 is provided to cockpit instrumentation 122 (e.g., fuel gauge 124). Optionally, low fuel warnings are triggered in flight-control feedback system 132 by avionics system controller 120 or cockpit instrumentation 122.

Avionics system controller 120 also performs an aircraft stability calculation 1016 to generate flight-control information 1018. Flight-control information 1018 is signaled to flight-control feedback system 132 to trigger a cockpit warning 1020, auto flight process 1022, or other flight-control feedback 1024.

In some embodiments, aircraft stability calculation 1016 facilitates providing the pilot with flight-control information 1018 regarding stability relative to yaw, pitch, and roll as well as angle of attack so that the overall stability of the aircraft can be determined by exploiting flight-control information 1018 and relationships present between fuel sloshing (e.g., as determined by the fuel senders), airspeed, load factor (e.g., as determined by the accelerometers onboard the fuel senders and angle of attack sensor) and angle of attack (e.g., as determined by the angle of attack sensor).

In some embodiments, fluid motion is derived from changes in slosh amplitude, damping rate, or modeled surface response, such as through volume-of-fluid (VOF)

analysis. This derived fluid motion data is treated as a distinct input alongside AoA and kinematic measurements. Together, these parameters are used to generate a composite stability score reflecting free surface dynamics of the fluid, which serves as a proxy for overall aircraft stability. In this context, a dynamically stable free surface suggests coordinated flight, whereas irregular or divergent fluid motion may indicate an unstable aircraft condition, including potential stall, spin, or uncoordinated maneuvering.

In certain embodiments, the system assesses aircraft stability by analyzing the coherence of signals from multiple fluid sensors and associated accelerometers distributed throughout the wing-mounted liquid system. Each sensor generates a time-series signal indicative of local fluid motion, such as slosh-induced acceleration.

Phase coherence refers to the timing alignment between slosh waveforms across different sensor locations. When signals from multiple sensors rise and fall in sync, they are considered in phase; when one signal leads or lags another, a phase offset is present. High phase coherence indicates uniform, stable fluid motion—often associated with coordinated flight—while low phase coherence may signal uncoordinated conditions such as yaw instability or the onset of a spin.

Amplitude coherence compares the magnitude of the acceleration signals across sensors. High amplitude across all sensors may reflect large-scale fluid motion due to turbulence or abrupt maneuvers. Disparities in amplitude—such as a spike at one sensor and not others—may indicate asymmetrical loading, resonant excitation, or localized instability.

The system may compute phase and amplitude coherence using time-domain correlation (e.g., cross-correlation between sensor pairs) or frequency-domain techniques (e.g., coherence functions based on cross-spectral density). The resulting phase and amplitude coherence values may be used as input parameters to the stability calculation or as standalone coherence metrics. Thus, these metrics may be incorporated into the stability score or used to trigger dynamic thresholds for stall, spin, or turbulence warnings.

For example, in the Relationship 3, below, stability is related to the fuel sloshing and wing acceleration ($\vec{a}$) (in all three axial directions) at various airspeeds. Stability is a unitless value, comparable to a score.

$$\text{Stability(roll, pitch, yaw)} \sim \text{Gust} \qquad \text{Relationship 3}$$
$$\text{Factor} * \frac{\vec{a}}{\text{Allowable Load Factor at Airspeed}}$$

The stability in roll, pitch, and yaw are a factor of the first stability relationship (Relationship 3) and that of the following Relationships 4, 5, or 6 for yaw, pitch, and roll, respectively. Values obtained in connection with Relationship 3 in roll, pitch, and yaw are combined with those derived from, respectively, Relationships 6, 5, and 4 to obtain a composite stability metric.

$$\text{Stability(yaw)} = \|a_{LW,x} - a_{RW,x}\| \qquad \text{Relationship 4}$$

Yaw stability is related to the acceleration difference between the left and right wings through the integral of acceleration being airspeed and differences in airspeed between the left and right wings leading to a spin.

$$\text{Stability(pitch)} \sim AoA \text{ Sensor Reading} \qquad \text{Relationship 5}$$

Pitch stability is related to angle of attack which is determined by the angle of attack sensor.

$$\text{Stability(roll)} \sim C_{Fuel\text{-}sloshing\ s,l} \qquad \text{Relationship 6}$$

where s is side, and l is location. Roll stability also has a relationship to the fuel sloshing coefficient for senders in opposite locations on each wing (i.e., if the inboard sender on the left wing experiences a drastic fuel rise and the outboard sender on the right wing experiences a similar effect then the roll stability will change if yaw and pitch are not detected).

The stability value (score) will determine if the aircraft is sufficiently stable. The stability score may be displayed to the pilot either broken down by motion—yaw, pitch, and roll—or as a composite metric representing overall flight condition. Additionally, the angle of attack is supplied to the pilot to provide additional insight into aerodynamic state, including early indications of an impending stall.

In some embodiments, the system employs a weighted sensor fusion algorithm to integrate the multiple inputs, such as fuel slosh displacement, wing-specific acceleration, angle of attack, and airspeed, into a unified stability score. Each input may be normalized and scaled to account for signal variability and sensitivity. For instance, AoA oscillations may be given higher weight during low-speed flight, while slosh asymmetry may carry more significance during turbulent or crosswind conditions. In one implementation, the system applies a confidence factor or signal quality check to each input channel, adjusting the weight dynamically based on recent consistency, rate of change, or redundancy with other inputs. The resulting stability score is computed as a weighted function of the fused signals and compared against axis-specific thresholds for yaw, pitch, and roll. This approach allows the system to reduce false positives (e.g., turbulence mistaken for pilot-induced roll) and to trigger feedback only when a consistent, multi-modal instability profile is observed.

Using the detection signatures shown in FIG. 7-FIG. 9, the system derives real-time stability metrics and composite scores described in FIG. 11-FIG. 14. These later figures demonstrate how the raw sensor signals feed into formalized calculations, such as load factor, derived airspeed asymmetry, and angle-of-attack trends, and how those calculations are visualized, evaluated, and used to inform flight-control feedback logic.

Figure 11:
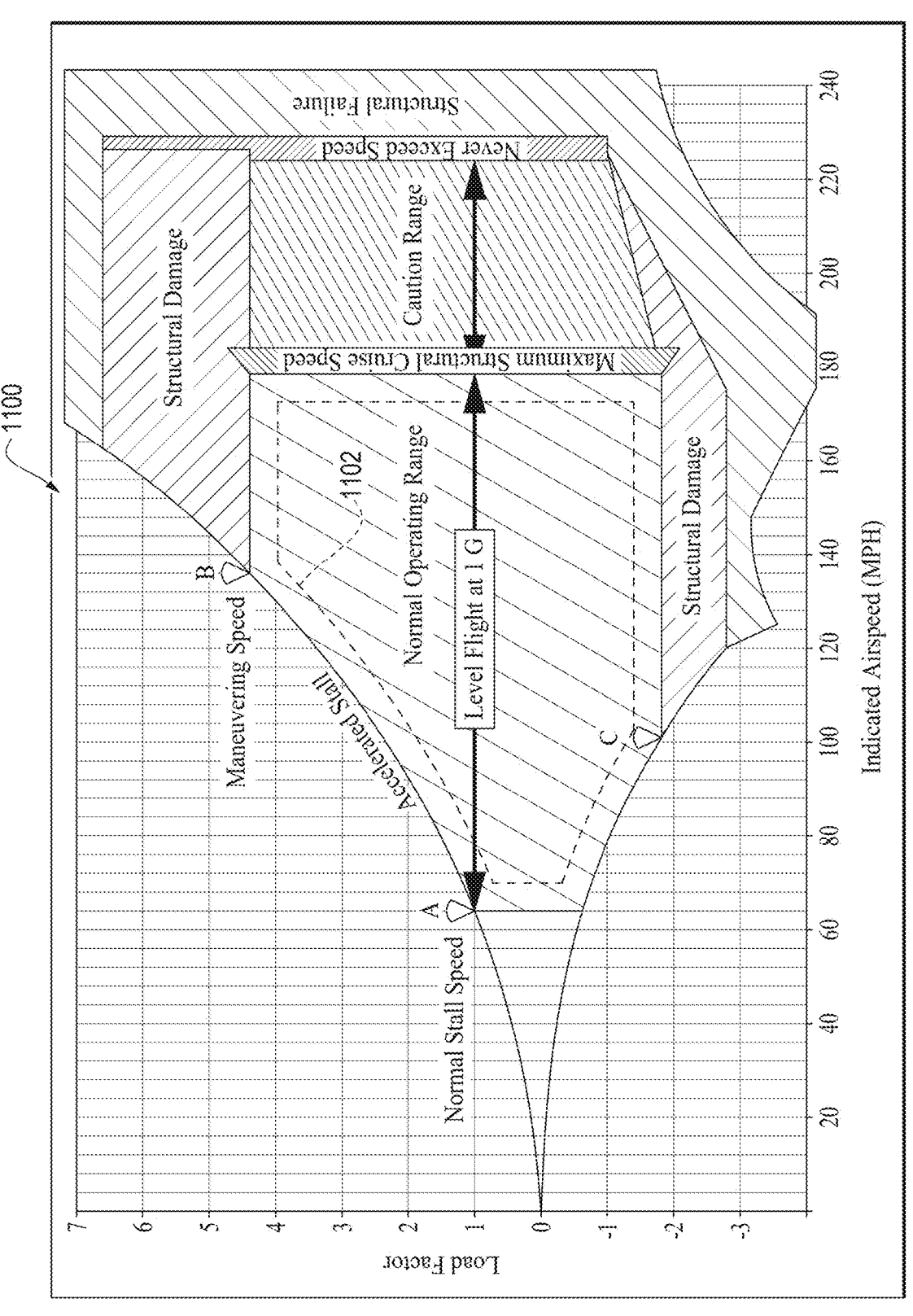
FIG. 11 is a V-N diagram in accordance with one embodiment.

For instance, as a visual representation of aircraft stability calculation 1016 and flight-control information 1018, FIG. 11 is a V-N diagram 1100, also known as a Velocity-Load Factor diagram or a flight envelope diagram, showing the relationship between an aircraft's airspeed (velocity) and the load factor (N) it experiences during flight. The load factor is the ratio of the lift generated by the aircraft to its weight and is typically expressed in terms of gravitational force (G).

V-N diagram 1100 is representative of a dynamically updated flight envelope computed by avionics system controller 120 in response to local kinematics measurements 1010. As such, flight-control information 1018 is shown in the form of annotated stability lines 1102, which are derived based on aircraft stability calculation 1016. For example, because an inexperienced pilot may add additional g forces, beyond those expected from a smooth flight, stability lines 1102 are inset so that flight-control feedback 1024 is triggered in anticipation of those additional G forces (i.e., a more conservative envelope is computed). When the flight is smoother, then stability lines 1102 are relaxed.

Skilled persons in light of this disclosure will appreciate that various other control schemes may be implemented in response to local kinematics measurements 1010. Furthermore, they will appreciate the visual representation in FIG. 11 is for case of explanation. In practice, the data and parameters are stored in memory, as explained in connection with FIG. 17.

Figure 12:
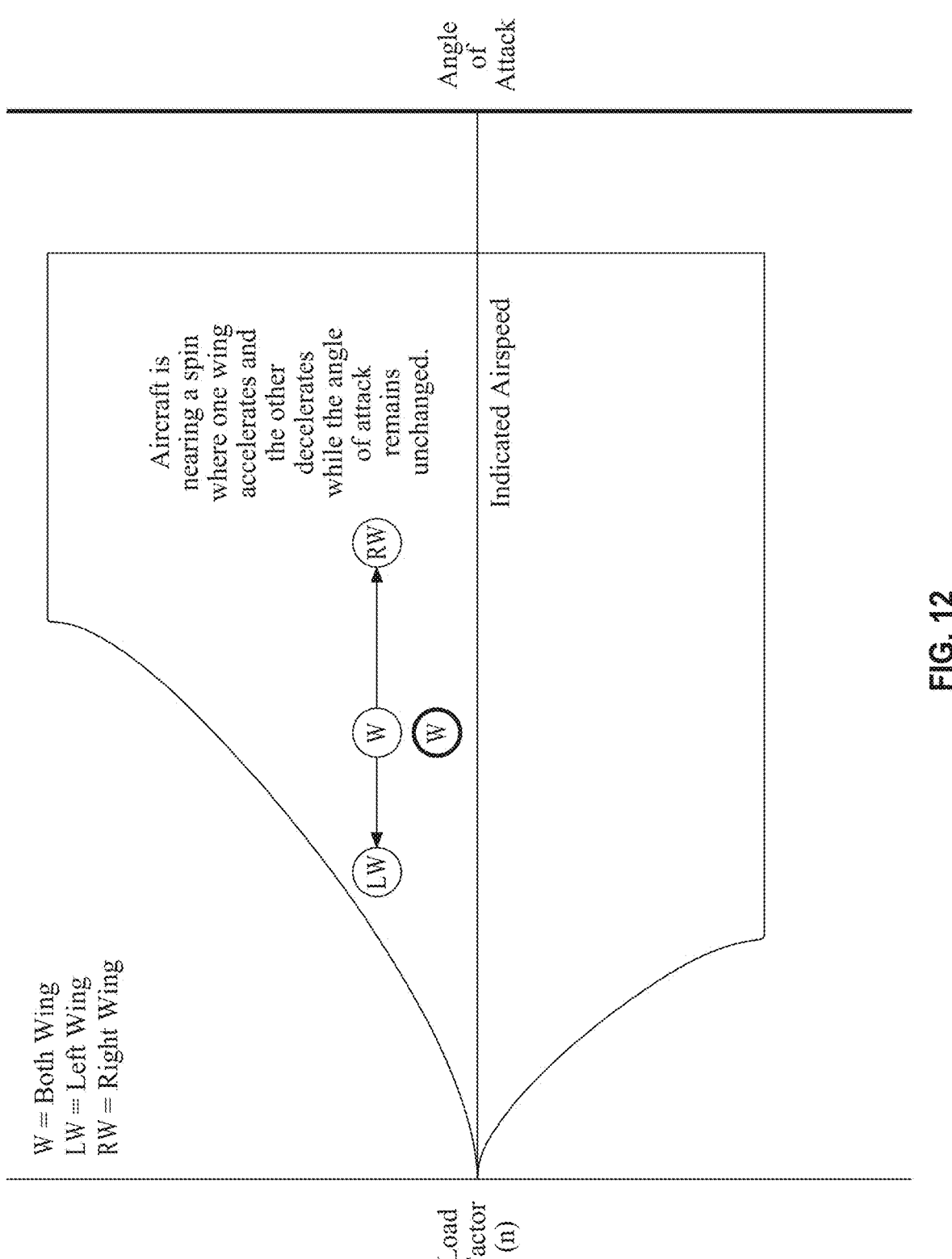
FIG. 12 is an annotated V-N diagram showing an example of instability in accordance with one embodiment.

FIG. 12 shows a situation in which the load factor has not changed, however, following acceleration of the right wing and deceleration of the left wing, the aircraft is approaching a state where one wing is much faster than the other, leading to spin. The speed difference at which a spin occurs will also be influenced by the angle of attack, although that is not depicted here. Instability introduced by changes in acceleration at the wings will be observed in the Relationship 3 due to fuel sloshing and acceleration, as well is in Relationship 4.

Figure 13:
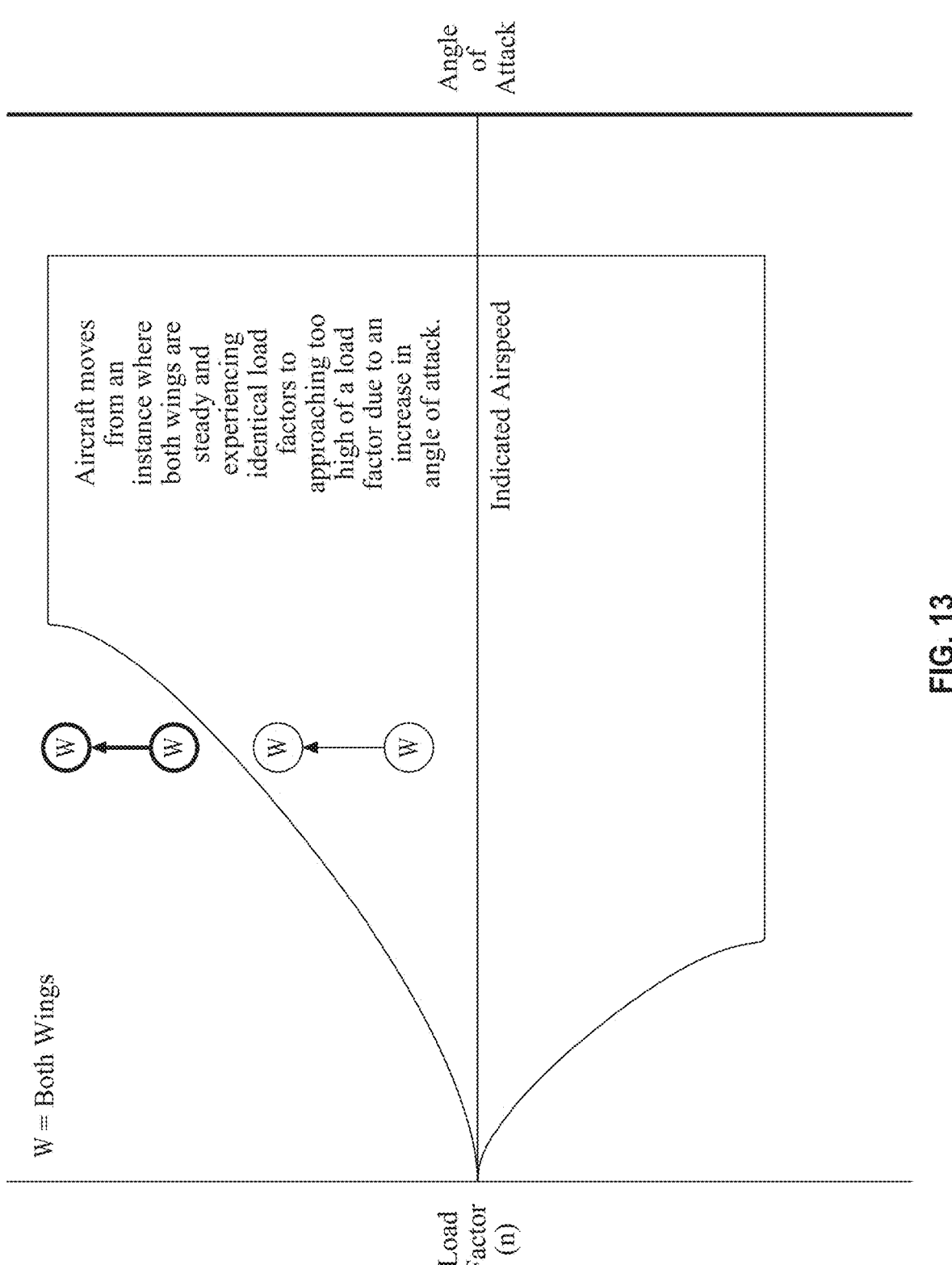
FIG. 13 is an annotated V-N diagram showing an example of instability in accordance with one embodiment.

FIG. 13 shows the load factor on the aircraft has changed substantially (i.e., steep bank, not shown, or aggressive climb, which is shown) while the aircraft speed remains unchanged. Therefore, the aircraft stability decreases due to the increased load factor, as indicated in Relationship 3 (where ⁻ corresponds to a load factor).

Figure 14:
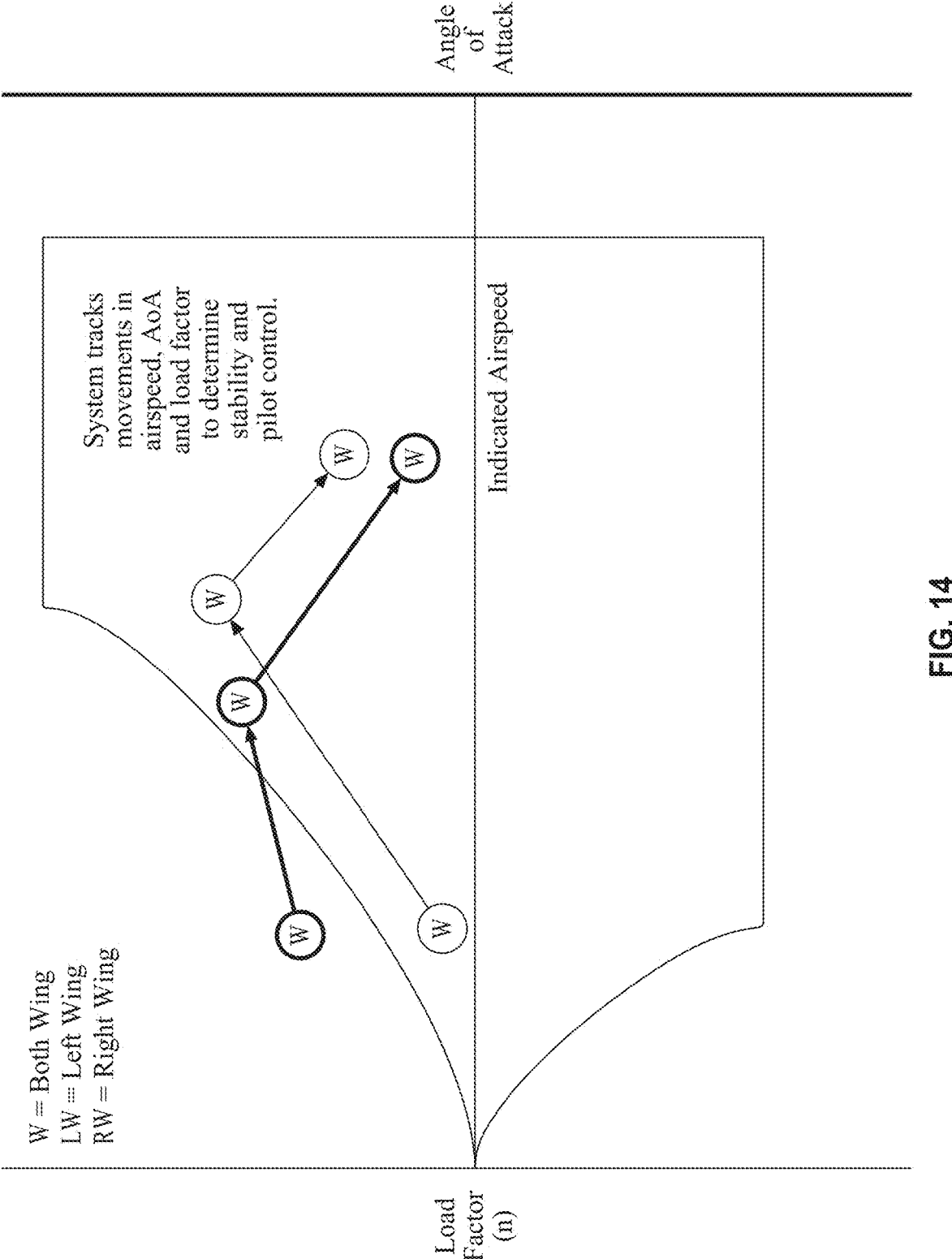
FIG. 14 is an annotated V-N diagram showing an example of instability in accordance with one embodiment.

FIG. 14 shows system tracking of angle of attack, load factor, and airspeed during a slight accent and decent. Increased instability will be observed based on the relationships described previously (e.g., Relationships 3 and 5).

Once instability is detected using the above metrics, the system initiates specific feedback actions or control adjustments. In operation, the avionics system controller uses the aircraft's stability score, computed from sensor data including fuel slosh, accelerometer measurements, and angle of attack, to initiate appropriate feedback when the score exceeds defined thresholds. For example, if angle of attack exhibits high-frequency oscillations coinciding with a sharp vertical acceleration spike, the system identifies a stall condition and issues an audible or visual warning to the pilot. If differential acceleration between left and right wing accelerometers leads to diverging integrated velocities, the system interprets this as a developing spin. In that case, the controller may trigger haptic feedback, such as vibration in the control stick or seat, and may disengage the autopilot to return manual control to the pilot. For more moderate conditions, such as a brief roll upset with asymmetric slosh, feedback may include envelope protection responses, such as temporary restrictions on bank or pitch angle, or prompts to activate a "level mode." These stability evaluations occur continuously and are prioritized during dynamic flight segments. The thresholds for response may also vary depending on phase of flight, with tighter tolerances during landing, takeoff, or low-speed operation. This approach ensures that sensor-derived stability information results in timely, proportional interventions that assist the pilot while preserving safe flight.

FIG. 15 shows a process 1500 performed by an avionics system controller in a stability assessment system for an aircraft. In block 1502, process 1500 receives local tank levels and local kinematics measurements from a plurality of liquid-level senders, wherein each liquid-level sender includes a liquid-level sensor configured to measure local fluid levels within a wing-mounted liquid system and an onboard accelerometer configured to measure local kinematics. In block 1504, process 1500 receives AoA information from an AoA sensor configured to measure the angle of attack. In block 1506, process 1500 performs an aircraft stability calculation based on the local kinematics measurements and the AoA information to determine the stability of the aircraft. In block 1508, process 1500 generates flight-control information based on the aircraft stability calculation. In block 1510, process 1500 triggers flight-control feedback using a flight-control feedback system based on the flight-control information.

FIG. 16 is a flow chart for a process 1600, performed by a stability-detecting angle of attack AoA system, for detecting stability in an aircraft. In block 1602, process 1600 measures the AoA using an AoA sensor to generate AoA information. In block 1604, process 1600 measures local fluid levels within a wing-mounted liquid system using a plurality of liquid-level sensors, each liquid-level sensor being part of a liquid-level sender that includes a liquid-level sensor configured to measure local fluid levels, an onboard accelerometer configured to measure local kinematics, and a processor configured to process the local fluid level measurements and local kinematics to generate local tank levels by compensating for fluid motion and temperature. In block 1606, process 1600 receives, at an avionics system controller, the local tank levels and local kinematics measurements from the plurality of liquid-level senders. In block 1608, process 1600 performs a tank level calculation at the avionics system controller to generate a combined tank level. In block 1610, process 1600 performs an aircraft stability calculation at the avionics system controller based on the local kinematics measurements and the AoA information. In block 1612, process 1600 generates flight-control information based on the aircraft stability calculation. In block 1614, process 1600 triggers flight-control feedback using a flight-control feedback system based on the flight-control information.

Figure 17:
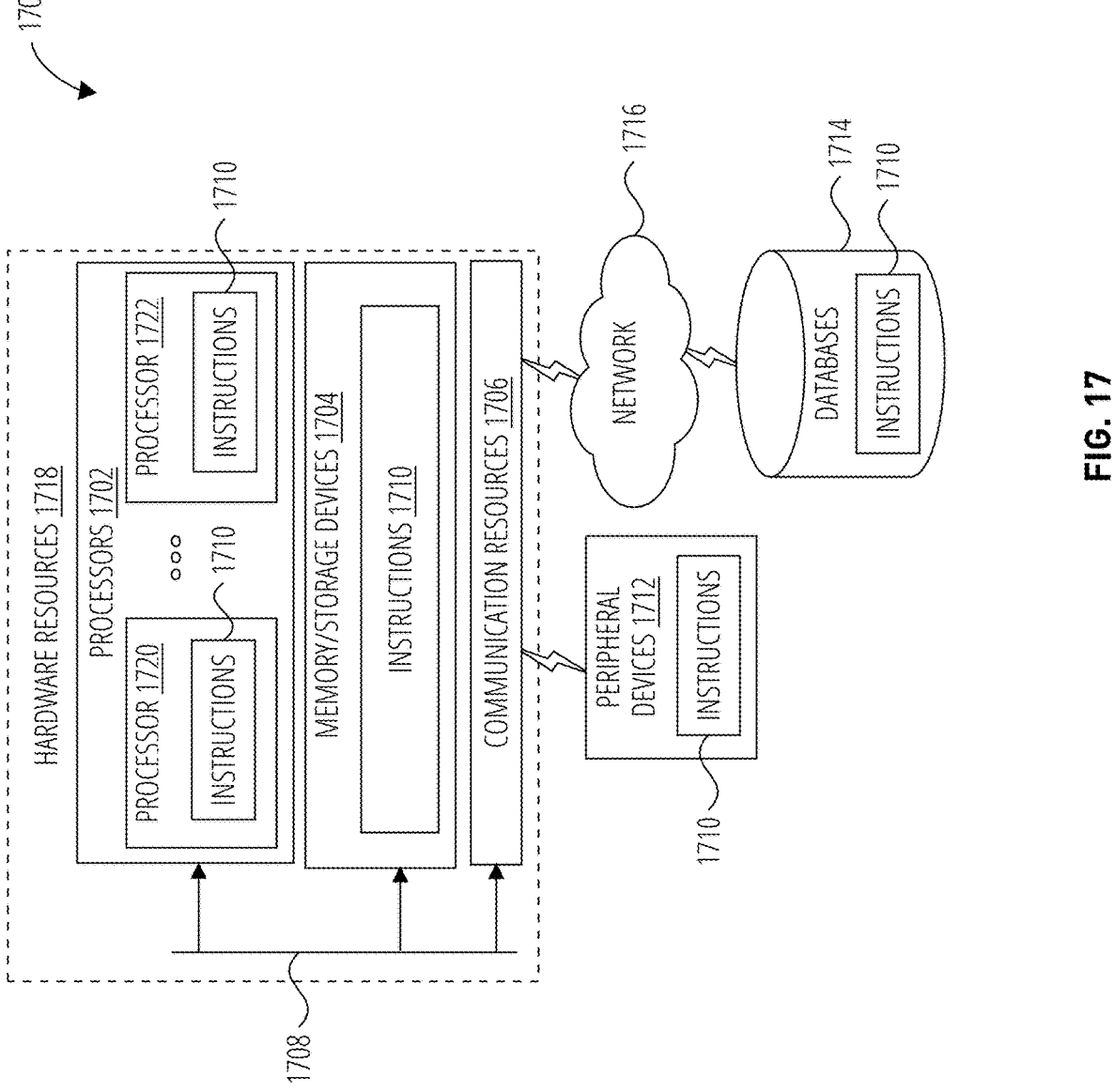
FIG. 17 is a block diagram of computing components for performing the disclosed processes in accordance with one embodiment.

FIG. 17 is a block diagram illustrating example computing components 1700 that may be used to implement the signal processing, stability detection, and feedback control techniques described in this disclosure. These components may be included in a central avionics system controller, in local processors integrated with wing-mounted sensors, or in any other suitable computing node on the aircraft.

Components 1700 include one or more processors 1702, memory and storage resources 1704, and communication interfaces 1706, which are communicatively coupled via a system bus 1708. Processors 1702, which is implemented with circuitry, may include any combination of CPUs, digital signal processors (DSPs), or application-specific integrated circuits (ASICs), field programmable gate arrays (FPGAs) and hardware based logic controllers, and may be configured to perform one or more operations such as: filtering sensor data, modeling fluid slosh, integrating accelerometer readings to determine wing velocities, detecting stall or spin events, or triggering output signals for flight-control feedback. The term processor or circuitry, therefore, includes any suitable combination of processing logic, including microcontrollers, digital signal processors, or embedded systems.

Memory/storage 1704 may include both volatile and non-volatile media for storing sensor data, calibration parameters, detection thresholds, and executable instructions. Communication resources 1706 may include wireless or wired interfaces for transmitting and receiving data between sensors, flight control systems, cockpit displays, or remote maintenance systems. These may support protocols such as CAN bus, RS-485, USB, or Ethernet.

Instructions 1710 may include embedded firmware, software modules, or compiled code for executing any of the techniques described herein. These instructions may be stored locally in memory 1704 or received from external devices 1712 or databases 1714 via network 1716. In operation, instructions 1710 enable processors 1702 to carry out the methods described in this disclosure, including local detection of instability, signal generation for cockpit feedback, or participation in a broader avionics control system.

CONCLUDING REMARKS

In light of this disclosure, skilled persons will appreciate that many changes may be made to the details of the above-described embodiments without departing from the underlying principles of the invention. For example, though some examples are provided for fuel and fuel tanks, the disclosed techniques may be employed for various other liquids. The scope of the present invention should, therefore, be determined only by claims and equivalents.

What is claimed is:

1. A stability assessment system for an aircraft, comprising:

an angle of attack (AoA) sensor configured to measure the angle of attack and generate AoA information;

a plurality of liquid-level senders positioned within a wing-mounted liquid system, each configured to measure fluid levels and generate fluid data indicative of rapid fluid motion within the wing-mounted liquid system, the rapid fluid motion being correlated with real-time aircraft stability;

a plurality of accelerometers associated with the wing-mounted liquid system and configured to generate kinematics data; and circuitry configured to:

determine real-time aircraft stability based on the fluid data, the kinematics data, and the AoA information; and trigger a pilot alert or automated flight-control action based on the real-time aircraft stability.

2. The stability assessment system of claim 1, in which each liquid-level sender of the plurality of liquid-level senders is associated with a respective accelerometer and a processor configured to apply motion and temperature compensation to local fluid level measurements and generate local tank levels.

3. The stability assessment system of claim 2, in which the circuitry is included in an avionics system controller communicatively coupled to a plurality of liquid-level senders and the AoA sensor, the avionics system controller configured to:

receive local tank levels and local kinematics measurements;

generate local fluid motion data; and compute a stability score based on the local kinematics measurements, the local fluid motion data, and the AoA information.

4. The stability assessment system of claim 3, in which the avionics system controller is further configured to generate the pilot alert or automated flight-control action based on the stability score.

5. The stability assessment system of claim 1, in which determining real-time aircraft stability includes analyzing phase or amplitude variation in the fluid data and the kinematics data from, respectively, different sets of liquid-level senders and accelerometers.

6. The stability assessment system of claim 1, in which the real-time aircraft stability is determined based on a coherence measurement derived from comparing fluid data from different sensor locations.

7. The stability assessment system of claim 6, in which the coherence measurement includes at least one of a phase offset or amplitude variation between a first fluid sensor and a second fluid sensor, each with a corresponding accelerometer.

8. The stability assessment system of claim 1, in which the plurality of liquid-level senders includes float-based fuel sensors.

9. The stability assessment system of claim 1, in which the automated flight-control action is an auto flight process change.

10. The stability assessment system of claim 1, in which the trigger causes a flight-control feedback system to generate the pilot alert or automated flight-control action.

11. The stability assessment system of claim 10, in which the pilot alert is a cockpit warning.

12. The stability assessment system of claim 11, in which the cockpit warning is one or more of an audible alarm, haptic feedback in a seat, haptic feedback in a flight control stick, or a visual indicator on cockpit instrumentation.

13. The stability assessment system of claim 1, in which the AoA sensor includes a leading-edge lift transducer or a fuselage-mounted airflow sensor.

14. The system of claim 1, in which the circuitry is further configured to detect stall independently for each wing based on the fluid data generated by the plurality of liquid-level senders positioned within the wing-mounted liquid system.

15. The system of claim 1, in which the fluid data generated by the plurality of liquid-level senders positioned within the wing-mounted liquid system provides localized stability information specific to each wing, and the circuitry is further configured to determine stall as a wing-localized aerodynamic condition.

16. The system of claim 1, in which the circuitry is further configured to evaluate aircraft motion across multiple stability axes including pitch, roll, and yaw based on the fluid data and the kinematics data when determining the real-time aircraft stability.

17. The system of claim 1, in which the circuitry is further configured to identify asymmetric wing behavior by comparing the fluid data or the kinematics data generated by liquid-level senders positioned in different wings of the wing-mounted liquid system.

18. A method for assessing real-time aircraft stability and generating flight-control feedback, comprising:

receiving angle of attack (AoA) information from an AoA sensor;

receiving fluid data from a plurality of liquid-level senders positioned within a wing-mounted liquid system, the fluid data being indicative of rapid fluid motion within the wing-mounted liquid system at respective sender locations, the rapid fluid motion being correlated with real-time aircraft stability;

receiving kinematics data from a plurality of accelerometers associated with the wing-mounted liquid system;

determining real-time aircraft stability based on the fluid data, the kinematics data, and the AoA information; and triggering a pilot alert or automated flight-control action based on the determined real-time aircraft stability.

19. The method of claim 18, in which each liquid-level sender includes an embedded accelerometer and a processor configured to locally generate the fluid data and kinematics data.

20. The method of claim 18, further comprising transmitting the fluid data and kinematics data from the liquid-level senders to an avionics system controller for determining real-time aircraft stability.

21. The method of claim 18, in which determining real-time aircraft stability comprises computing a stability score based on the fluid data, the kinematics data, and the AoA information.

22. The method of claim 21, in which computing the stability score includes applying a threshold comparison to trigger the pilot alert or automated flight-control action.

23. The method of claim 18, in which determining real-time aircraft stability includes analyzing inter-sensor coherence among the fluid data.

24. The method of claim 23, in which the inter-sensor coherence comprises a phase offset or amplitude variation between fluid data from different sender locations.

25. The method of claim 18, in which triggering the pilot alert comprises activating a visual display, an audible indicator, or a haptic control surface response.

26. The method of claim 18, in which triggering the automated flight-control action comprises modifying a control surface, initiating an envelope protection routine, or engaging a spin-recovery procedure.

27. The method of claim 18, in which the AoA sensor comprises a leading-edge lift transducer or a fuselage-mounted airflow sensor.

28. The method of claim 18, further comprising detecting stall independently for each wing based on the fluid data received from the plurality of liquid-level senders positioned within the wing-mounted liquid system.

29. The method of claim 18, in which the fluid data received from the plurality of liquid-level senders positioned within the wing-mounted liquid system provides localized stability information specific to each wing, and determining the aircraft stability includes determining stall as a wing-localized aerodynamic condition.

30. The method of claim 18, in which determining the aircraft stability includes evaluating aircraft motion across multiple stability axes including pitch, roll, and yaw based on the fluid data and the kinematics data.

* * * * *